(12) United States Patent
Danziger et al.

(10) Patent No.: US 11,536,975 B2
(45) Date of Patent: Dec. 27, 2022

(54) OVERLAPPING FACETS

(71) Applicant: LUMUS LTD., Ness Ziona (IL)

(72) Inventors: Yochay Danziger, Kfar Vradim (IL); Tsion Axel Eisenfeld, Ashkelon (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 17/478,982

(22) Filed: Sep. 20, 2021

(65) Prior Publication Data
US 2022/0003914 A1  Jan. 6, 2022

Related U.S. Application Data

(63) Continuation of application No. 16/686,231, filed on Nov. 18, 2019, now Pat. No. 11,125,927, which is a continuation of application No. 15/951,171, filed on Apr. 12, 2018, now Pat. No. 10,481,319, which is a continuation of application No. PCT/IL2018/050025, filed on Jan. 8, 2018.

(60) Provisional application No. 62/474,614, filed on Mar. 22, 2017.

(51) Int. Cl.
| | | |
|---|---|---|
| *G02B 27/01* | (2006.01) | |
| *B29D 11/00* | (2006.01) | |
| *F21V 8/00* | (2006.01) | |
| *G02B 27/00* | (2006.01) | |

(52) U.S. Cl.
CPC ...... *G02B 27/0172* (2013.01); *B29D 11/0073* (2013.01); *G02B 6/0035* (2013.01); *G02B 27/0081* (2013.01); *G02B 2027/0178* (2013.01)

(58) Field of Classification Search
CPC .......... B29D 11/00663; B29D 11/0073; G02B 27/017; G02B 27/0172
See application file for complete search history.

(56) References Cited

U.S. PATENT DOCUMENTS

| | | |
|---|---|---|
| 3,829,197 A | 8/1974 | Thelen |
| 5,430,505 A | 7/1995 | Katz |
| 5,712,694 A | 1/1998 | Taira et al. |
| 5,930,046 A | 7/1999 | Solberg et al. |
| 6,154,321 A | 11/2000 | Melville et al. |
| 6,231,992 B1 | 5/2001 | Niebauer et al. |
| 6,239,092 B1 | 5/2001 | Papasso et al. |
| 6,394,607 B1 | 5/2002 | Hashizume et al. |
| 6,404,550 B1 | 6/2002 | Yajima |
| 6,542,307 B2 | 4/2003 | Gleckman et al. |
| 6,671,100 B1 | 12/2003 | McRuer |
| 8,187,481 B1 | 5/2012 | Hobbs |

(Continued)

FOREIGN PATENT DOCUMENTS

| | | |
|---|---|---|
| CN | 205787362 U | 12/2016 |
| JP | H02182447 A | 7/1990 |

(Continued)

*Primary Examiner* — Michael Stahl
(74) *Attorney, Agent, or Firm* — Mark M. Friedman

(57) ABSTRACT

Specific management of configuration of overlap of facets reduces non-uniformity in an image outcoupled toward a nominal point of observation. A waveguide including at least two parallel surfaces, first, middle, and last partially reflecting facets are configured such that in a geometrical projection of the facets onto one of the surfaces the facets overlap, preferably with adjacent facets overlapping and non-adjacent facets starts and ends coinciding along at least a portion of the waveguide.

4 Claims, 13 Drawing Sheets

(56) References Cited

U.S. PATENT DOCUMENTS

| | | |
|---|---|---|
| 8,479,119 B2 | 7/2013 | Hörentrup et al. |
| 8,665,178 B1 | 3/2014 | Wang |
| 10,222,535 B2 | 3/2019 | Remhof et al. |
| 10,678,055 B2 | 6/2020 | Edwin et al. |
| 11,256,100 B2 | 2/2022 | Schultz et al. |
| 11,378,391 B2 | 7/2022 | Do et al. |
| 2002/0080487 A1 | 6/2002 | Yajima |
| 2005/0024849 A1 | 2/2005 | Parker et al. |
| 2007/0015967 A1 | 7/2007 | Freeman et al. |
| 2008/0151375 A1 | 6/2008 | Lin |
| 2010/0201953 A1 | 8/2010 | Freeman |
| 2010/0214635 A1 | 8/2010 | Sasaki et al. |
| 2011/0096566 A1 | 4/2011 | Tsai et al. |
| 2011/0109880 A1 | 5/2011 | Nummela |
| 2013/0135749 A1 | 5/2013 | Akutsu et al. |
| 2013/0208362 A1 | 8/2013 | Bohn et al. |
| 2014/0019801 A1 | 7/2014 | Lamb et al. |
| 2015/0138646 A1* | 5/2015 | Tatsugi ............... G02B 6/0065 264/1.27 |
| 2015/0182348 A1 | 7/2015 | Siegal et al. |
| 2015/0289762 A1 | 10/2015 | Popovich et al. |
| 2015/0338655 A1 | 11/2015 | Sawada et al. |
| 2017/0353714 A1 | 12/2017 | Poulad et al. |
| 2017/0371160 A1 | 12/2017 | Schultz |
| 2018/0275409 A1 | 9/2018 | Gao et al. |
| 2018/0284443 A1 | 10/2018 | Matsuki et al. |
| 2018/0341223 A1 | 11/2018 | Shestak et al. |
| 2020/0192089 A1 | 6/2020 | Haddick et al. |
| 2021/0247608 A1 | 8/2021 | Eisenfeld et al. |

FOREIGN PATENT DOCUMENTS

| | | |
|---|---|---|
| JP | 1996313843 | 11/1996 |
| JP | 2012-037761 U | 2/2012 |
| JP | 2012058404 A | 3/2012 |
| WO | WO2015012280 | 3/2017 |
| WO | 2021-055278 | 3/2021 |

* cited by examiner

FIG. 10A
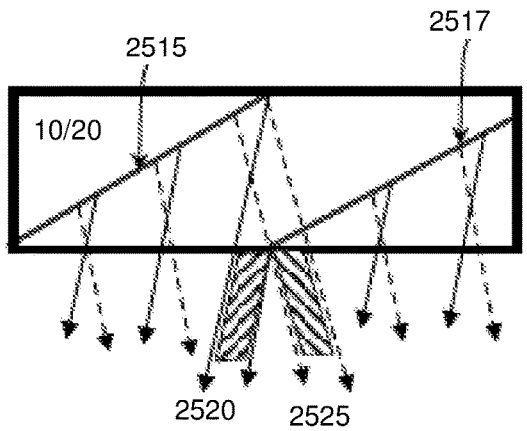
FIG 10B
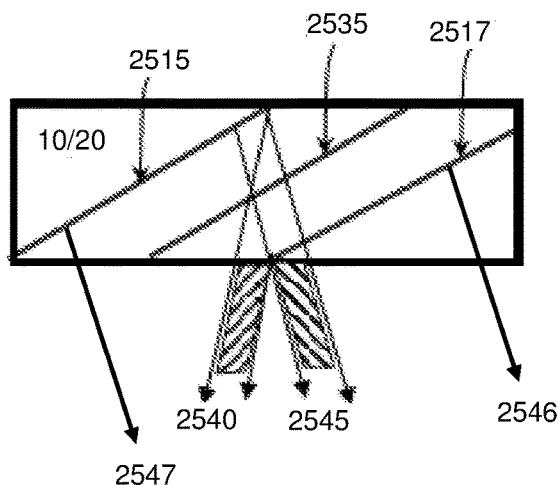
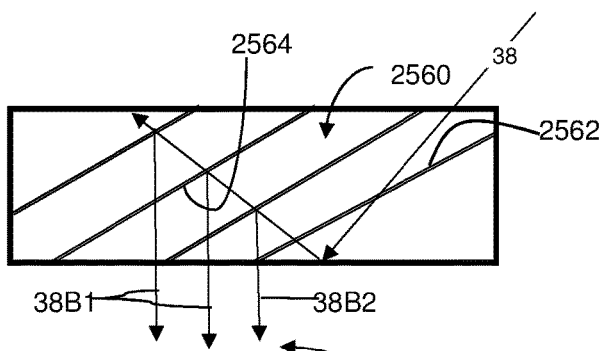
Fig. 11A
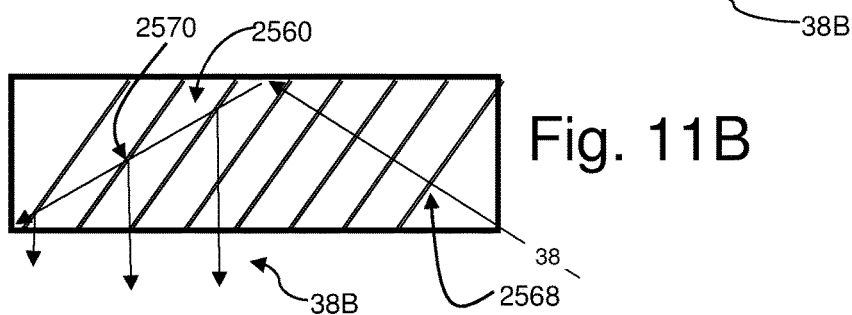
Fig. 11B
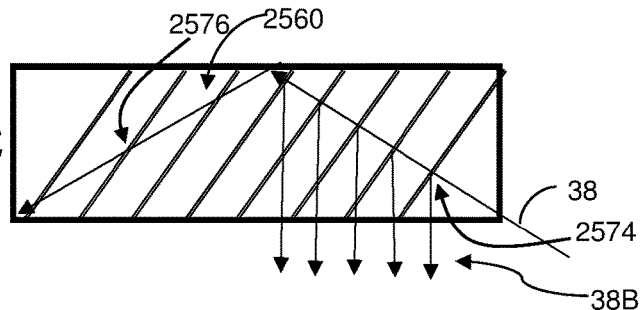
Fig. 11C FIG. 12A    FIG. 12B
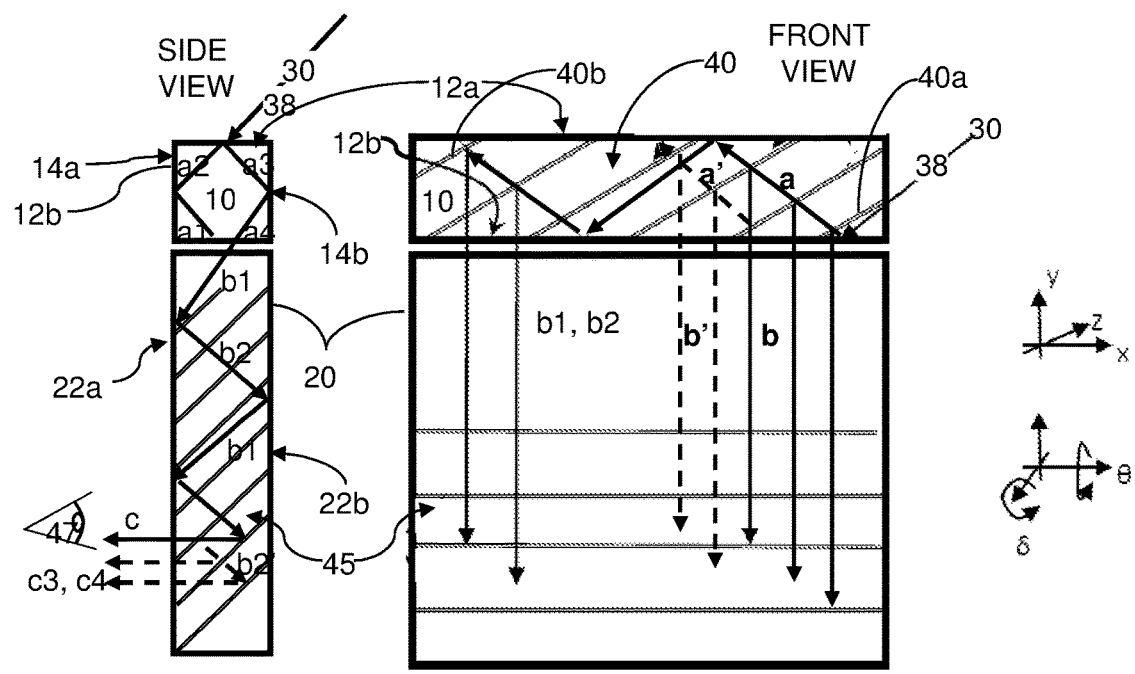
FIG. 12C    FIG. 12D
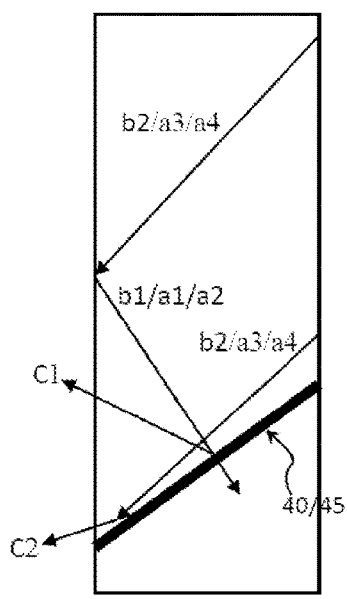
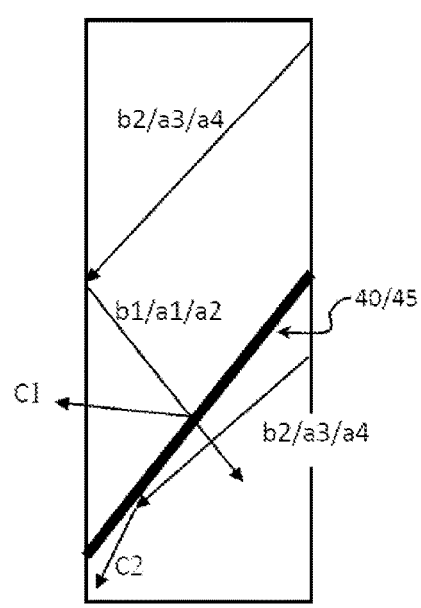

FIG. 20A
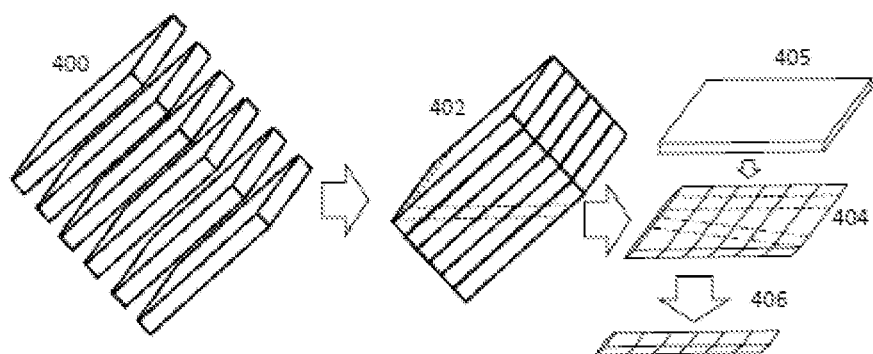
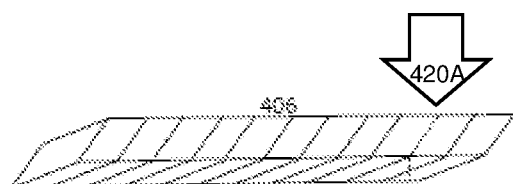
FIG. 20B
FIG. 20C
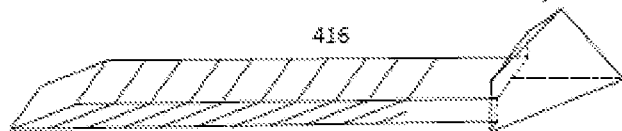
FIG. 20D
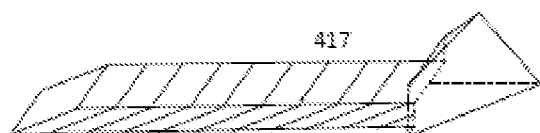
FIG. 20E

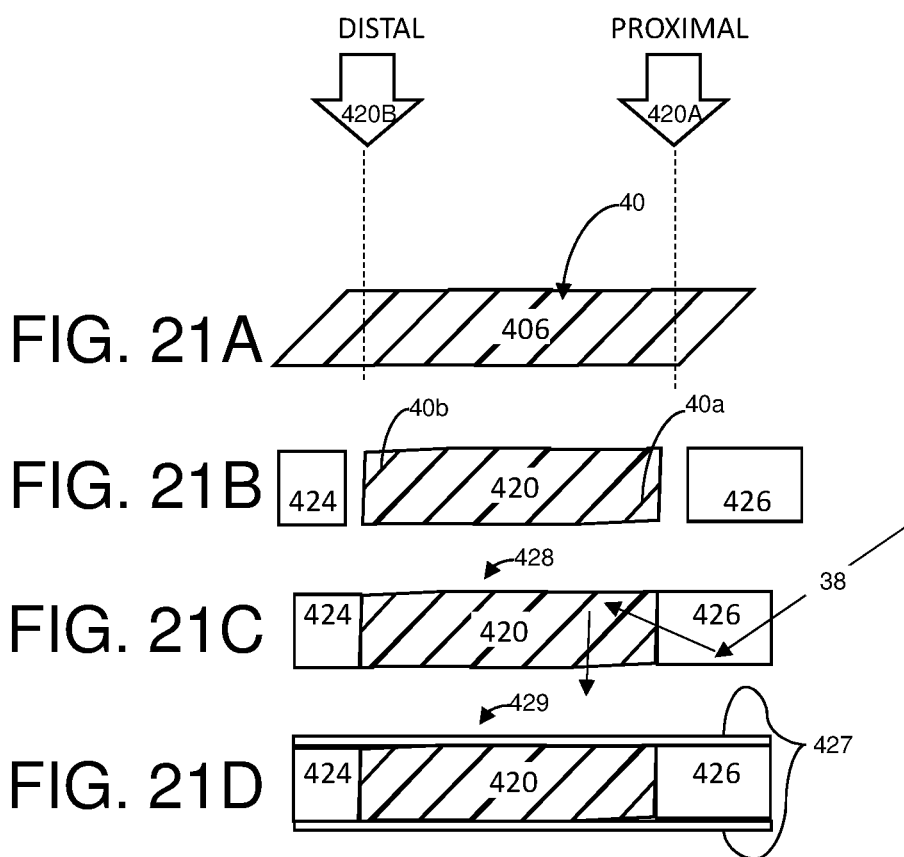

OVERLAPPING FACETS

FIELD OF THE INVENTION

The present invention generally relates to optics, and in particular, it concerns uniform reflection.

BACKGROUND OF THE INVENTION

One of the important applications for compact optical elements is with head-mounted displays (HMD), in which an optical module serves as both an imaging lens and a combiner, whereby a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), a scanning source or similar devices, or indirectly, by means of a relay lens or an optical fiber bundle. The display includes an array of elements (pixels) imaged to infinity by a collimating lens and transmitted into the eye of the viewer by means of a reflecting, or partially reflecting, surface acting as a combiner for non-see-through or see-through applications, respectively. Typically, a conventional, free-space optical module is used for this purpose. As the desired field-of-view (FOV) of the system increases, such a conventional optical module necessarily becomes larger, heavier, and bulkier, rendering the device impractical, even for moderate performance. These are major drawbacks for all kinds of displays, but especially so for head-mounted applications wherein the systems must necessarily be as light and as compact as possible.

The strive for compactness has led to several different complex optical solutions, all of which, on one hand, are still not sufficiently compact for most practical applications, and on the other hand, are difficult to manufacture. Furthermore, the eye-motion-box (EMB) of the optical viewing angles resulting from these designs is usually very small—typically less than 8 mm Hence, the performance of the optical systems are very sensitive even to small movements relative to the eye of the viewer, and do not allow sufficient pupil motion for convenient reading of a displayed text.

SUMMARY

According to the teachings of the present embodiment there is provided an optical device including: a waveguide having: a first of at least one pair of surfaces parallel to each other; a first region at which light is coupled into the waveguide; and a first sequence of facets including: a first facet: located proximally to the first region; and having a first width in a direction between the first pair of surfaces; a last facet: at a distal end of the first sequence of facets from the first region; and having a third width in a direction between the first pair of surfaces; and one or more middle facets: between the first facet and the last facet; and having a second width in a direction between the first pair of surfaces; wherein each of the facets width is in a plane of the facet; is an at least partially reflecting surface; is at an oblique angle to the first pair of surfaces; has a facet-start on a proximal side of the facet width; and has a facet-end on a distal side of the facet width; and wherein a geometrical projection is onto one of the first pair of surfaces in a direction of a nominal ray outcoupled from the waveguide, the nominal ray being a central ray of the light being coupled out of the waveguide, the geometrical projection of the last facet and each of the one or more middle facets overlaps a respective the geometrical projection of an adjacent the one or more middle facets and the first facet, and the geometrical projection of the facet-start of the last facet and each of the one or more middle facets coinciding with a respective the geometrical projection of a non-adjacent facet-end of the one or more middle facets and the first facet, the coinciding along at least a portion of the waveguide.

In an optional embodiment, the first width of the first facet is less than the second width of the one or more middle facets. In another optional embodiment, a number of the facets is crossed by the nominal ray outcoupled from the waveguide, the number of facets being constant for all of the first sequence of facets. In another optional embodiment, the light corresponds to an image and the central ray is a center ray from a center of the image. In another optional embodiment, the light corresponds to an image and the central rays corresponds to a central pixel of the image. In another optional embodiment, the last facet has a reflectivity that is substantially 100% of a nominal reflectivity, the nominal reflectivity being the total reflection needed at a specific location in the waveguide. In another optional embodiment, the third width is less than the second width. In another optional embodiment, the third width is substantially half of the second width. In another optional embodiment, the one or more middle facets is selected from the group consisting of: one; two; three; four; five; and a plurality. In another optional embodiment, a constant number of facets overlap in a line of sight toward a nominal point of observation of the light coupling out of the waveguide via one of the first pair of surfaces. In another optional embodiment, a width of one of the facets of the first sequence of facets varies monotonically relative to a width of an adjacent one of the facets of the first sequence of facets. In another optional embodiment, a spacing between one pair of adjacent facets of the first sequence of facets varies monotonically relative to an adjacent spacing between another pair of adjacent facets of the first sequence of facets. In another optional embodiment, the light from the first region is such that at least a portion of the light encounters the first facet before encountering one of the one or more middle facets. In another optional embodiment, a spacing between adjacent facets is larger than the coherence length of the light being coupled into the waveguide.

In an optional embodiment, the first width is substantially equal to the second width; and the first facet has a first section corresponding to the geometrical projection of the first facet that is nonoverlapping with the geometrical projection of an adjacent middle facet. In another optional embodiment, the first section is transparent to the light. In another optional embodiment, the first section has a reflectivity substantially twice a reflectivity of an adjacent facet. In another optional embodiment, the facets have uniform partial reflectivity across the facet.

In an optional embodiment, the waveguide further has: a second pair of surfaces parallel to each other and non-parallel to the first pair of surfaces; and the facets configured such that, when an image is coupled into the waveguide at the first region with an initial direction of propagation at a coupling angle oblique to both the first and second pairs of surfaces, the image advances by four-fold internal reflection along the waveguide. In another optional embodiment, the second pair of surfaces are perpendicular to the first pair of surfaces. In another optional embodiment, the facets is at an oblique angle to the second pair of surfaces.

In an optional embodiment, the first width of the first facet is substantially equal to the second width of the middle facets; a first reflectivity of the first facet is greater than 50% of a nominal reflectivity; a second facet adjacent to the first facet has a second reflectivity such that the second reflectivity plus the first reflectivity are substantially the nominal reflectivity; a third facet adjacent to the second facet has a third reflectivity greater than 50% of the nominal reflectivity and less than the first reflectivity; and a fourth facet adjacent to the third facet has a fourth reflectivity such that the fourth reflectivity plus the third reflectivity are substantially the nominal reflectivity.

In another optional embodiment, the first width of the first facet is substantially equal to the second width of the middle facets; a sequence of beginning odd facets includes the first facet, and a given number of every other facets from the first facet; a sequence of beginning even facets includes a second facet adjacent to the first facet, and a given number of every other facets from the second facet; a first set of facets includes a first odd facet from the sequence of beginning odd facets and a corresponding first even facet from the sequence of beginning odd facets; the first odd facet having a first reflectivity greater than 50% of a nominal reflectivity; the first even facet having a second reflectivity such that the second reflectivity plus the first reflectivity are substantially the nominal reflectivity; each subsequent set of facets including a next odd and even facets from respective sequences of beginning odd and even facets; each of the odd facets from the subsequent sets having an odd reflectivity greater than 50% of the nominal reflectivity and less than a reflectivity of an odd facet from a previous set; and each of the even facets from the subsequent sets having an even reflectivity such that adding the odd reflectivity to a corresponding even facet's even reflectivity is substantially the nominal reflectivity.

BRIEF DESCRIPTION OF FIGURES

The embodiment is herein described, by way of example only, with reference to the accompanying drawings, wherein:

FIG. 10A is a schematic view of a waveguide with non-overlapping facets, illustrating the effects of variation on image uniformity.

FIG. 10B is a schematic view of a waveguide with overlapping facets, illustrating the effects of variation on image uniformity.

FIG. 11A to FIG. 11C are exemplary alternative configurations for implementation of overlapping facets, having different angular propagation configurations.

FIG. 12A and FIG. 12B are schematic side and front representations, respectively, of a two dimensional optical aperture multiplier.

FIG. 12C and FIG. 12D are schematic diagrams illustrating two possible geometries of image rays propagating relative to partially reflecting internal facets in waveguides from the optical aperture multiplier of FIG. 12A and FIG. 12B.

FIG. 20A illustrates a process which may be used to produce a waveguide with overlapping facets.

FIGS. 20B-20E are an exemplary procedure for attachment of a coupling prism.

FIGS. 21A-21D are further details of an exemplary procedure for creating a waveguide with overlapping facets.

ABBREVIATIONS AND DEFINITIONS

For convenience of reference, this section contains a brief list of abbreviations, acronyms, and short definitions used in this document. This section should not be considered limiting. Fuller descriptions can be found below, and in the applicable Standards.

1D—one-dimensional
2D—two-dimensional
CRT—cathode ray tube
EMB—eye-motion-box
FOV—field-of-view
HMD—head-mounted display
HUD—head-up display
LCD—liquid crystal display
LOE—light-guide optical element
OLED—organic light emitting diode array
SLM—spatial light modulator
TIR—total internal reflection

DETAILED DESCRIPTION

The principles and operation of the system according to a present embodiment may be better understood with reference to the drawings and the accompanying description. A present invention is an optical device to generate uniform reflection toward an observer.

Specific management of configuration of overlap of facets reduces non-uniformity in an image outcoupled toward a nominal point of observation. A waveguide including at least two surfaces, first, middle, and last partially reflecting facets are configured such that in a geometrical projection of the facets onto one of the surfaces the facets overlap, preferably with adjacent facets overlapping and non-adjacent facets starts and ends coinciding along at least a portion of the waveguide.

Basic Technology—FIGS. 1 to 9

Figure 1:
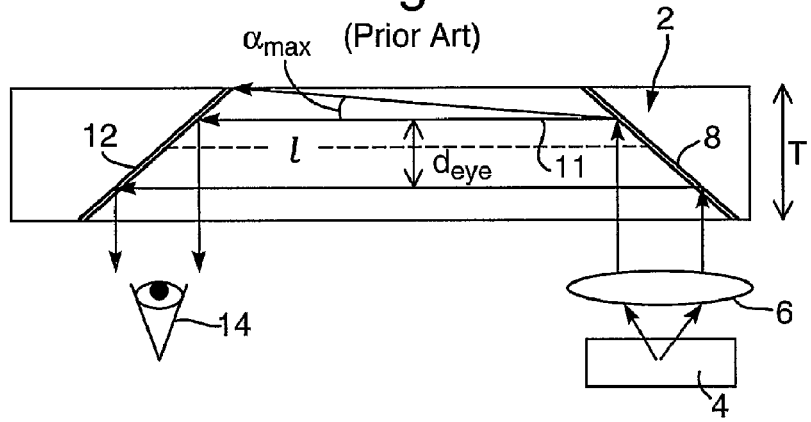
FIG. 1 is a side view of a prior art folding optical device.

FIG. 1 illustrates a conventional prior art folding optics arrangement, wherein the substrate 2 is illuminated by a display source 4. The display is collimated by a collimating optics 6, e.g., a lens. The light from the display source 4 is coupled into substrate 2 by a first reflecting surface 8, in such a way that the main ray 11 is parallel to the substrate plane. A second reflecting surface 12 couples the light out of the substrate and into the eye of a viewer 14. Despite the compactness of this configuration, this configuration suffers significant drawbacks. In particular, only a very limited FOV can be achieved.

Figure 2:
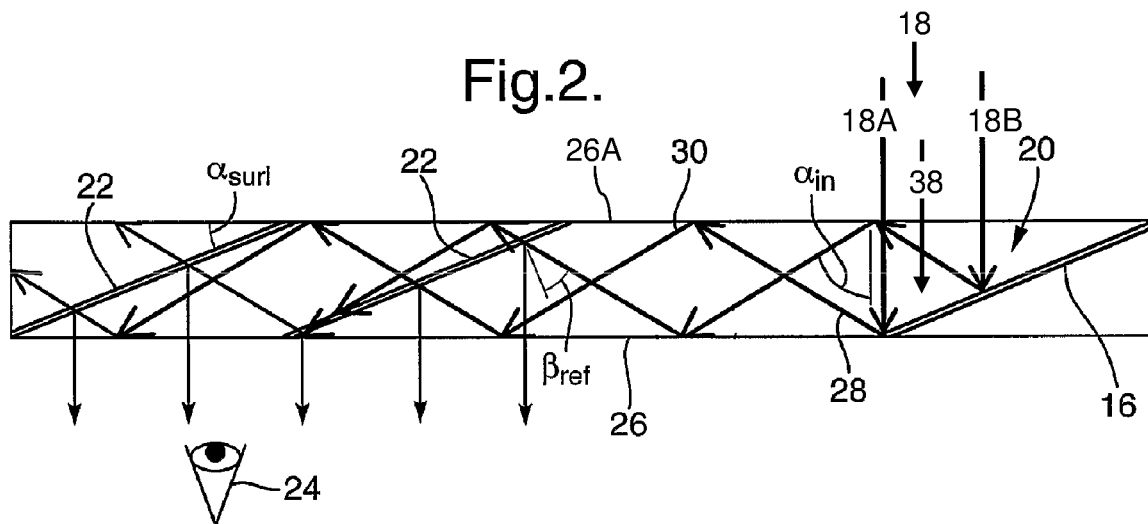
FIG. 2 is a side view of an exemplary light-guide optical element.

Refer now to FIG. 2 is a side view of an exemplary light-guide optical element (LOE). To alleviate the above limitations, the present embodiment utilizes an array of selectively reflecting surfaces, fabricated within a light-guide optical element (LOE). The first reflecting surface 16 is illuminated by a collimated display light ray (beams) 18 emanating from a light source (not shown) located behind the device. For simplicity in the current figures, only one light ray is generally depicted, the incoming light ray 38 (also referred to as the "beam" or the "incoming ray"). Other rays of incoming light, such as beams 18A and 18B may be used to designate edges of the incident pupil, such as a left and right edge of an incoming light pupil. Generally, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image.

The reflecting surface 16 reflects the incident light from the source such that the light is trapped inside a waveguide 20 by total internal reflection. The waveguide 20 is also referred to as a "planar substrate" and a "light-transmitting substrate." The waveguide 20 includes at least two (major) surfaces parallel to each other, shown in the current figure as a lower (major) surface 26 and an upper (major) surface 26A.

Incoming light ray 38 enters the substrate at a proximal end of the substrate (right side of the figure). Light propagates through the waveguide and one or more facets, normally at least a plurality of facets, and typically several facets, toward a distal end of the waveguide (left side of the figure). Light propagates through the waveguide in both an initial direction 28 of propagation, and another direction 30 of propagation.

After several reflections off the surfaces of the substrate 20, the trapped waves reach an array of selectively reflecting surfaces 22, which couple the light out of the substrate into the eye 24 of a viewer. In alternative configurations, the selectively reflecting surfaces 22 are immediately after light ray 18 enters the substrate, without first reflecting off the surfaces of the substrate 20.

Internal, partially reflecting surfaces, such as selectively reflecting surfaces 22 are generally referred to in the context of this document as "facets." In the limit, facets can also be entirely reflecting (100% reflectivity, or a mirror, for example the last facet at the distal end of a substrate), or minimal-reflecting. For augmented reality applications, the facets are partially reflecting, allowing light from the real world to enter via upper surface 26A, traverse the substrate including facets, and exit the substrate via lower surface 26 to the eye 24 of the viewer. For virtual reality applications, the facets may have alternative reflectivities, such as the first coupling in mirror having 100% reflectivity, as the image light from the real world does not have to traverse this mirror. The internal partially reflecting surfaces 22 generally at least partially traverse the waveguide 20 at an oblique angle (i.e., neither parallel nor perpendicular) to the direction of elongation of the waveguide 20.

References to reflectivity are generally with respect to the nominal reflectivity. The nominal reflectivity being the total reflection needed at a specific location in the substrate. For example, if the reflectivity of a facet is referred to as 50%, generally this refers to 50% of the nominal reflectivity. In a case where the nominal reflectivity is 10%, then 50% reflectivity results in the reflectivity of the facet being 5%. One skilled in the art will understand the use of percentages of reflectivity from context of use. Partial reflection can be implemented by a variety of techniques, including, but not limited to transmission of a percentage of light, or use of polarization.

Figure 3A:
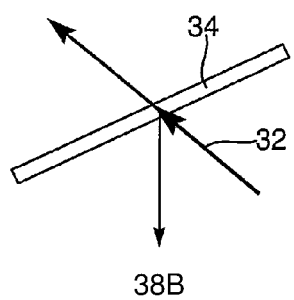
FIGS. 3A and 3B illustrate the desired reflectance and transmittance characteristics of selectively reflecting surfaces, for two ranges of incident angles.
Figure 3B:
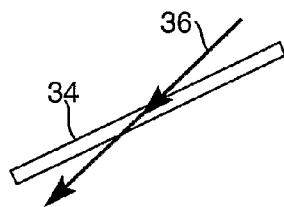

FIGS. 3A and 3B illustrate a desired reflectance behavior of selectively reflecting surfaces. In FIG. 3A, the ray 32 is partially reflected from facet 34 and coupled out 38B of the substrate 20. In FIG. 3B, the ray 36 is transmitted through the facet 34 without any notable reflection.

Figure 4:
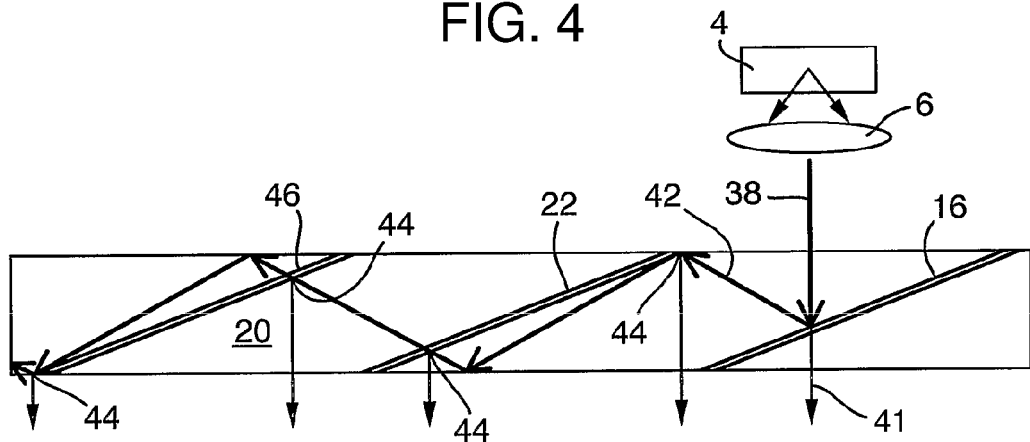
FIG. 4 is a diagram illustrating an exemplary configuration of a light-guide optical element.

FIG. 4 is a detailed sectional view of an array of selectively reflective surfaces that couple light into a substrate, and then out into the eye of a viewer. As can be seen, a ray 38 from the light source 4 impinges on the first partially reflective surface. Part of the ray 41 continues with the original direction and is coupled out of the substrate. The other part of the ray 42 is coupled into the substrate by total internal reflection. The trapped ray is gradually coupled out from the substrate by the other two partially reflecting surfaces 22 at the points 44. The coating characteristics of the first reflecting surface 16 should not necessarily be similar to that of the other reflecting surfaces 22, 46. This coating can be a simpler beam-splitter, either metallic, dichroic or hybrid metallic-dichroic. Similarly, in a case of a non-see-through system, the last reflecting surface 46 can be a simple mirror.

Figure 5:
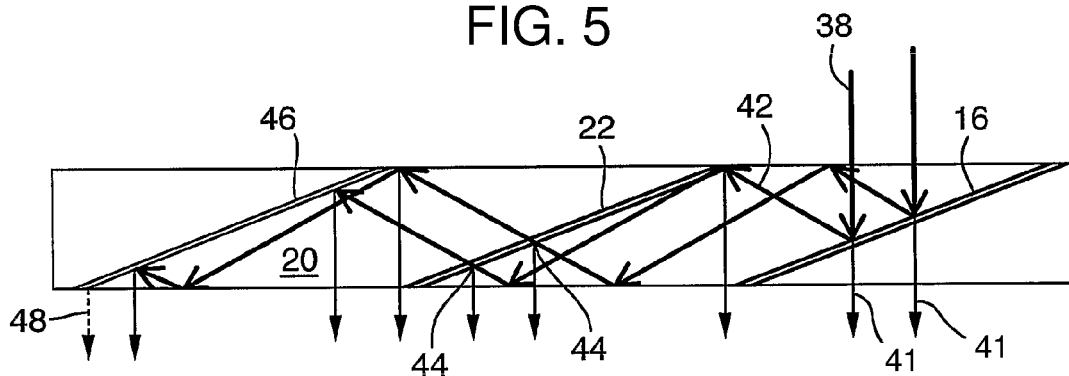
FIG. 5 is a diagram illustrating another configuration of a light-guide optical element.

FIG. 5 is a detailed sectional view of an apparatus including an array of reflective surfaces wherein the last surface 46 is a total reflecting mirror. It is true that the extreme left part of the last reflecting surface 46 cannot be optically active in such a case, and the marginal rays 48 cannot be coupled out from the substrate. Hence, the output aperture of the device will be slightly smaller. However, the optical efficiency can be much higher and fabrication process of the LOE can be much simpler.

It is important to note that, unlike the configuration illustrated in FIG. 2, there is a constraint on the orientation of the reflective surfaces 16 and 22. In the former configuration all the light is coupled inside the substrate by the reflective surface 16. Hence, surface 16 need not be parallel to surfaces 22. Moreover, the reflecting surfaces might be oriented such that the light will be coupled out from the substrate in the opposite direction to that of the input waves.

For the configuration illustrated in FIG. 4, however, part of the input light is not reflected by surface 16, but continues in an original direction of the input light 38 and is immediately coupled-out from the substrate as output light 41. Hence, to ensure that all the rays originating from the same plane wave will have the same output direction, it is not enough that all the reflecting surfaces 22 are parallel to each other, but surface 16 should be parallel to these surfaces as well.

Refer again to FIG. 4 describes a system having two reflective surfaces for coupling the light out of the substrate, however, any number of reflective surfaces can be used according to the required output aperture of the optical system and the thickness of the substrate. Naturally, there are cases where only one coupling-out surface is required. In that case, the output aperture will essentially be twice the size of the input aperture of the system. The only required reflecting surfaces for the last configuration are simple beam-splitters and mirrors.

In the apparatus described in FIG. 4, the light from the display source is coupled into the substrate at the end of the substrate, however, there are systems where it is preferred to have a symmetric system. That is, the input light should be coupled into the substrate at the central part of the substrate.

Figure 6:
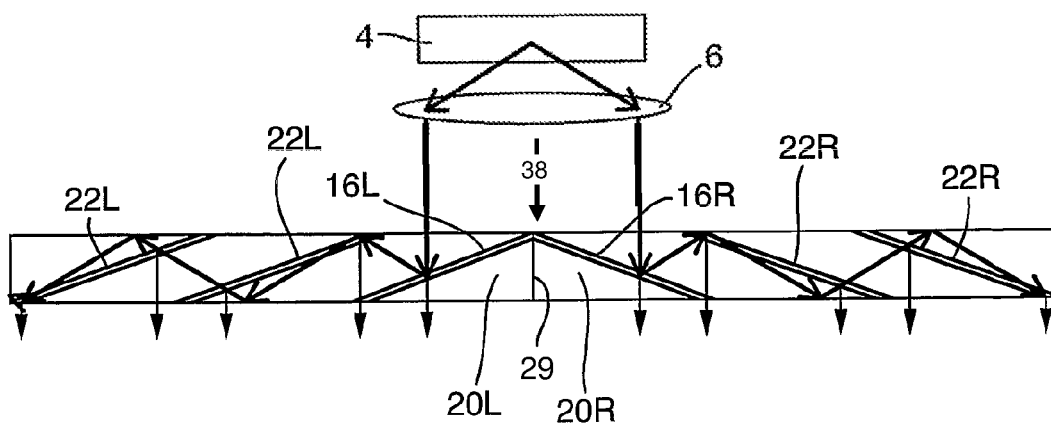
FIG. 6 is a diagram illustrating detailed sectional views of a transverse pupil expansion one-dimensional waveguide having a symmetrical structure.

FIG. 6 is a diagram illustrating detailed sectional views of a transverse pupil expansion one-dimensional waveguide having a symmetrical structure. The current figure illustrates a method to combine two identical substrates, to produce a symmetric optical module. As can be seen, part of the light from the display source 4 passes directly through the partially reflecting surfaces out of the substrate. The other parts of the light are coupled into the right side of the substrate 20R and into the left side of the substrate 20L, by the partially reflecting surfaces 16R and 16L, respectively. The trapped light is then gradually coupled out by the reflecting surfaces 22R and 22L, respectively. Apparently, the output aperture is three times the size of the input aperture of the system, the same magnification as described in FIG. 8. However, unlike the system there, the system here is symmetric about the cemented surface 29 of the right and left substrates.

Figure 7:
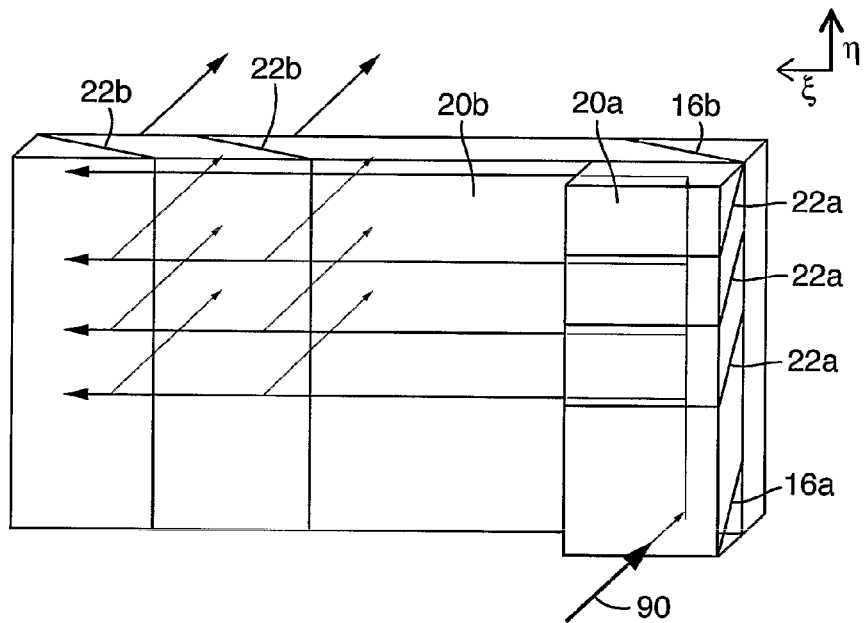
FIG. 7 is a diagram illustrating a method to expand a beam along two axes utilizing a double LOE configuration.
Figure 8:
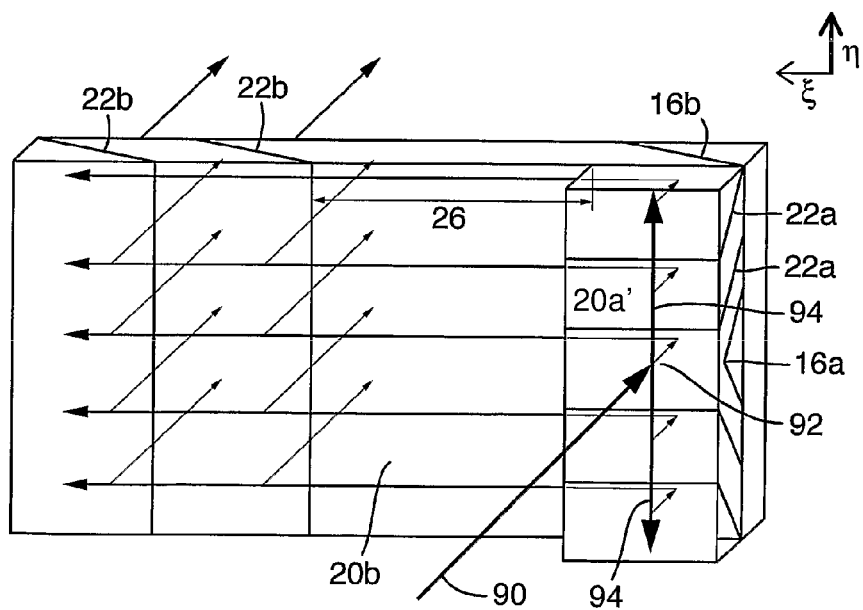
FIG. 8 is a diagram illustrating another method to expand a beam along two axes utilizing a double LOE configuration.

Refer now to FIG. 7 and FIG. 8, exemplary implementations of FIG. 5 and FIG. 6 on top of a waveguide. The configurations of FIG. 5 and FIG. 6 expand the incoming image laterally. The apparatus of FIG. 5 can be used to implement the first LOE 20a of FIG. 7, the apparatus of FIG. 6 can be used to implement the first LOE 20a' of FIG. 8, and the apparatus of FIG. 2 can be used to implement the second LOE 20b.

FIG. 7 illustrates an alternative method to expand the beam along two axes utilizing a double LOE configuration. The input wave 90 is coupled into the first LOE 20a, which has an asymmetrical structure similar to that illustrated in FIG. 5, by the first reflecting surface 16a and then propagates along the η axis. The partially reflecting surfaces 22a couple the light out of first LOE 20a and then the light is coupled into the second asymmetrical LOE 20b by the reflecting surface 16b. The light then propagates along the axis and is then coupled out by the selectively reflecting surfaces 22b. As shown, the original beam 90 is expanded along both axes, where the overall expansion is determined by the ratio between the lateral dimensions of the elements 16a and 22b. The configuration given in FIG. 7 is just an example of a double-LOE setup. Other configurations in which two or more LOEs are combined together to form complicated optical systems are also possible.

Refer now to FIG. 8, a diagram illustrating another method to expand a beam along two axes utilizing a double LOE configuration. Usually, the area where the light is coupled into the second LOE 20b by the surface 16b cannot be transparent to the external light and is not part of the see-through region. Hence, the first LOE 20a need not be transparent itself. As a result, it is usually possible to design the first LOE 20a to have a symmetric structure, as can be seen in the current figure, even for see-through systems. The second LOE 20b has an asymmetrical structure that enables the user to see the external scene. In this configuration, part of the input beam 90 continues along the original direction 92 into the coupling-in mirror 16b of the second LOE 20b, while the other part 94 is coupled into the first LOE 20a' by the reflecting surfaces 16a, propagates along the η axis and is then coupled into the second LOE 20b by the selectively reflecting surfaces 22a. Both parts are then coupled into the second asymmetrical LOE 20b by the reflecting surface 16b, propagate along the ξ axis, and are then coupled out by the selectively reflecting surfaces 22b.

Figure 9:
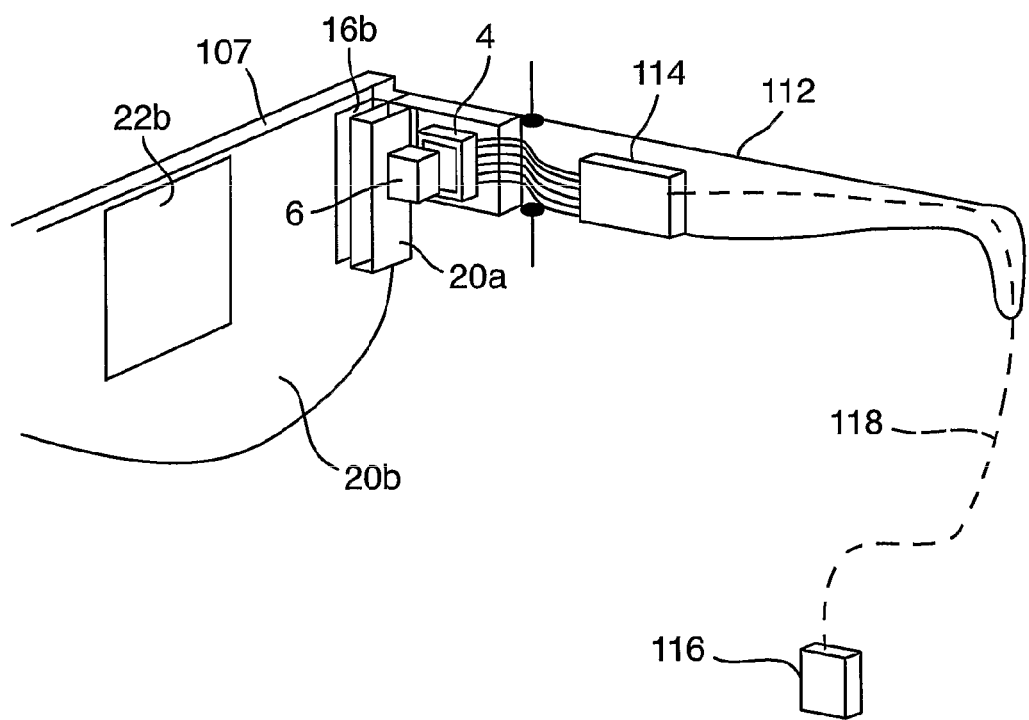
FIG. 9 illustrates an exemplary embodiment of LOEs embedded in a standard eyeglasses frame.

FIG. 9 illustrates an embodiment of LOEs 20a/20a' and 20b embedded in a standard eyeglasses frame 107. The display source 4, and the folding and the collimating optics 6 are assembled inside the arm portions 112 of the eyeglasses frame, just next to LOE 20a/20a', which is located at the edge of the second LOE 20b. For a case in which the display source is an electronic element, such as a small CRT, LCD, or OLED, the driving electronics 114 for the display source might be assembled inside the back portion of the arm 112. A power supply and data interface 116 is connectable to arm 112 by a lead 118 or other communication means including radio or optical transmission. Alternatively, a battery and miniature data link electronics can be integrated in the eyeglasses frame. The embodiment described in FIG. 9 is only an example. Other possible head-mounted displays arrangements can be constructed, including assemblies where the display source is mounted parallel to the LOE plane, or in the upper part of the LOE.

Additional details of this basic technology can be found in U.S. Pat. No. 7,643,214.

FIRST EMBODIMENT—FIGS. 10A TO 21D

Refer now to FIG. 10A, a schematic view of a waveguide with non-overlapping facets, illustrating the effects of variation on image uniformity. A source of perceived non-uniformity relates to angular overlap of internal facets in different fields of view. In the region of waveguide (10 or 20, see FIG. 12A and FIG. 12B) illustrated here, the waveguide contains internal facets (two are depicted as last facet 2515 and first facet 2517). Most of the out-coupled light is reflected from a single internal facet. However, at the edge of the facets, there is non-uniformity at off-axis angles. For a region of the FOV pointing to the left (marked as solid arrows), a conventional gap area 2520 (also generally referred to as an "underlapping area", "black line" area, or "dark strip" area) will not reflect any light, since at this angle there is an effective gap between the light reflected by the last facet 2515 and the first facet 2517, resulting in a dark strip in the perceived. On the other hand, light out-coupled to the right (marked as dashed arrows) has a conventional bright area 2525 (also generally referred to as a "partially overlapping" area, or "intense" area) within which there is overlap of the light reflected from 2515 and 2517 so that the waveguide will reflect almost twice the amount of light. Therefore, the non-uniformity in FIG. 10A will vary between roughly 200% and 0% of the median image intensity across the extended aperture in different regions of the FOV and eye positions.

Refer now to FIG. 10B, a schematic view of a waveguide with overlapping facets, illustrating the effects of variation on image uniformity. Substantial overlap is introduced between the facets, as illustrated in the current figure. In this case, the spacing between adjacent facets is halved, resulting in most parts of the FOV at most eye positions receiving illumination from the image via overlaid reflections from two facets. In this exemplary case, a single middle facet 2535 is configured between the last facet 2515 and the first facet 2517. Near the angular extremities of the image and the extremities of the facets, there will still be changes in the number of overlapping facets which contribute to certain regions of the image, as illustrated by underlapping area 2540 which originates from only one facet (the middle facet 2535) and bright area 2545 which is contributed to by three adjacent facets (2517, 2535, and 2515. Therefore, the output non-uniformity will vary between 50% and 150% of the median reflectivity.

The light from the first half (light propagating from the right) of facet 2517 will couple out as reduced energy (ray/output beam 2546) since at this position there is no overlapping of the next facet 2535 i.e. there is only one facet reflect the light to the observer. The same reduced power happens at the last half of facet 2515 (ray/output beam 2547). In these regions, the reflectivity will be 50% of the median reflectivity.

A feature of the current embodiment is management of configuration of overlapping of the facets, specifically optimizing the overlap to obtain a constant number of facets (more than one) reflecting light onto the observer. In other words, at least two facets reflect light toward a FOV of an observer.

Refer now to FIG. 11A to FIG. 11C, exemplary alternative configurations for implementation of overlapping facets for different reflection (angular propagation) configurations (these configurations are also described in FIG. 12C and FIG. 12D). For simplicity in the current figures, only one light ray is depicted, the incoming light ray 38 (also referred to as the "beam"), with corresponding out-coupling rays 38B. For simplicity, no cross coupling is depicted. Some of the outcoupling rays 38B1 pass through internal facets 2560 and some outcoupling rays 38B2 couple directly out.

In configuration FIG. 11A, the incoming ray 38 crosses the internal facets 2560 from both sides of the internal facets 2560. A first crossing is from behind facet 2562, and in this crossing a coating on this side of the facet should be transparent for this shallow angle. The beam also crosses facet 2564 from another side, that is on a front side, opposite the behind side, and at this exemplary steeper angle the coating of the facet should be partial reflective so part of the light is directed out of the waveguide. (A similar single facet is described in U.S. Pat. No. 7,391,573 B2).

In configurations shown in FIG. 11B and FIG. 11C, the angle of the internal facets 2560 and the direction of light propagation is set so that the beam (incoming ray 38) passes the internal facets 2560 always from the same side of the facets. The coating in the facets can be used to set the reflectivity and transmissivity so the appropriate beam (38B) is reflected out.

In FIG. 11B the beam 38 crosses the initial internal facets 2560 close to perpendicular, as shown at point 2568 where the facet coating is designed to be transparent. A second crossing is at a shallow angle as shown at point 2570 (further from perpendicular) where the coating is designed to be partial reflector so part of the light is coupled out (38B).

In FIG. 11C, the facet coating is set to be partial reflector close to perpendicular as shown at point 2574 and at an angle further from perpendicular to be transparent as shown at point 2576.

Referring now to the drawings, FIGS. 12A-12D illustrate overlapping facets in one-dimensional (1D) and two-dimensional (2D) waveguides of an optical aperture multiplier. In general, terms, an optical aperture multiplier according to an embodiment of the present invention includes a first optical waveguide 10 having a direction of elongation illustrated arbitrarily herein as corresponding to the "x-axis". First optical waveguide 10 has first and second pairs of parallel faces 12a, 12b, 14a, 14b forming a rectangular cross-section. A plurality of internal partially reflecting surfaces 40 at least partially traverse first optical waveguide 10 at an oblique angle (i.e., neither parallel nor perpendicular) to the direction of elongation.

The optical aperture multiplier preferably also includes a second optical waveguide 20, optically coupled with first optical waveguide 10, having a third pair of parallel faces 22a, 22b forming a slab-type waveguide, i.e., where the other two dimensions of waveguide 20 are at least an order of magnitude greater than the distance between third pair of parallel faces 22a, 22b. Here too, a plurality of partially reflecting surfaces 45 preferably at least partially traverse second optical waveguide 20 at an oblique angle to the third pair of parallel faces.

The optical coupling between the waveguides, and the deployment and configuration of partially reflecting surfaces 40, 45 are such that, when an image is coupled into first optical waveguide 10 with an initial direction 28 of propagation (for example, light ray 38) at a coupling angle oblique to both the first and second pairs of parallel faces 12a, 12b, 14a, 14b, the image advances by four-fold internal reflection (images a1, a2, a3 and a4) along first optical waveguide 10, with a proportion of intensity of the image reflected at partially reflecting surfaces 40 so as to be coupled into second optical waveguide 20, and then propagates through two-fold reflection (images b1, b2) within second optical waveguide 20, with a proportion of intensity of the image reflected at partially reflecting surfaces 45 so as to be directed outwards from one of the parallel faces as a visible image c, seen by the eye 47 of a user.

Turning now more specifically to FIG. 12A and FIG. 12B, schematic side and front representations, respectively, of a two-dimensional optical aperture multiplier, showing a first illustration of an implementation of the above description. First waveguide 10 is referred to herein as a two-dimensional (2D) waveguide in the sense that first waveguide 10 guides the injected image in two dimensions by reflection between two sets of parallel faces (in this case the first and second pairs of parallel faces 12a, 12b, 14a, 14b), while second waveguide 20 is referred to as a one-dimensional (1D) waveguide, guiding the injected image in only one dimension between one pair of parallel faces (in this case the third pair of parallel faces 22a, 22b).

A further improvement to reducing non-uniformity may result from the introduction of "multipath" images that are generated by the overlapping internal facets, as depicted in FIG. 12B. A similar process exists in general in overlapping facet implementations. The light propagating within 2D waveguide 10 (marked as solid arrows and designated "a") is coupled out (designated "b"), but some of the light from b is back-coupled to a' (marked as dashed arrows) before being coupled out as b' (marked as dashed arrows). This back-and-forth coupling between 'a' and 'b' causes averaging of the intensity across the aperture while maintaining light parallelism, thereby further improving light uniformity. This improvement can also be implemented in other waveguides with a similar process using overlapping facets, such as shown in FIG. 12A for 1D waveguide 20. The light propagating within 1D waveguide 20 (marked as solid arrows and shown as beams "b1" and "b2") is coupled out (shown as beam "c"), but some of the light from beam c is back-coupled to b2' (marked as dashed arrows) before being coupled out as beams c3 and c4 (marked as dashed arrows).

Light beam 38 from an optical image generator (not depicted) is injected into first waveguide 10 at an angle. Consequently, the light propagates along waveguide 10 while being reflected from all four external faces of the waveguide as shown in the side view of FIG. 12A. In this process, four conjugate beam vectors are generated a1, a2, a3, and a4 that represent the same image as the image is reflected internally by the faces.

The angle of beam 38 that is injected into waveguide 10 is set to reflect from all four external faces of this waveguide. The light beam should reflect from the bottom face 12b of first waveguide 10, i.e., the face adjacent to second waveguide 20, at shallow (grazing) angles and should preferably transmit from 10 into 20 at steep angles. This property can be achieved by total internal reflection (TIR) or by optical coating. A diffractive pattern can also perform this optical property by combining diffraction with transmission on the same surface. Reflection from the other three faces 12a, 14a, and 14b of first waveguide 10 can be generated the same way or by use of a reflecting coating.

Part of the guided light-beams (for example beam a1 and beam a2) within first waveguide 10 are reflected by the internal parallel partial reflectors (facets) 40 downward onto an input coupling surface of second waveguide 20. In second waveguide 20, these beams are defined as exemplary beams b1 and b2. In this process, the overlapping configuration causes cross-coupling, thereby improving uniformity without degradation of image quality (as described).

Beams b1 and b2 are reflected by the external faces and become conjugate, i.e., beam b1 is reflected to be beam b2 and vice versa (as depicted in FIG. 12A). The external front and back faces 14a, 14b of first waveguide 10 should be parallel to each other and, in this implementation, to the corresponding external faces 22a, 22b of second waveguide 20. Any deviation from parallelism will cause the coupled images from beams b1 and b2 not to be precise conjugate images, and image quality will degrade.

The internal facets 45 within second waveguide 20 reflect beam b2 outside the waveguides and into the eye of the observer 47. The internal facets 45 can also be overlapping, thereby further improving image uniformity as described for facets 40.

The reflection process by the internal facets in waveguides 10 and 20 is further explained in FIG. 12C and FIG. 12D. Two basic configurations are depicted, and differ by the relative angles of the light beams and the facets. In this schematic illustration, the beams a1, a2 and b1 are depicted as same vector (reference will be only to beam b1) since the same geometrical considerations apply to each as observed from a side view of the corresponding waveguide. Beams a3, a4 and b2 are also depicted as same vector (reference will be only to b2).

Light beams b2 are actually a bundle of rays propagating in same direction as depicted by two vectors in FIG. 12C. In this case, one vector is reflected by the external face to become beam b1 and onto the internal facet 40 (or 45) where part of the one vector is reflected as beam c1. The other beam b2 vector is reflected directly by facet as vector beam c2. The vector beams c1 and c2 represent the normal image and ghost image not necessarily in this order. In this configuration, beams b1 and b2 impinge on facet 45 from the same side.

FIG. 12D describes essentially the same process but where the geometry is such that beams b1 and b2 impinge on facet 40 (or 45) from opposite sides.

In both cases, the magnitude of reflection for images c1 and c2 in S and P polarizations is determined by the coating on these facets. Preferably, one reflection is the image and the other is suppressed since the other image corresponds to an unwanted "ghost" image. Suitable coatings for controlling which ranges of incident beam angles are reflected and which ranges of incident beam angles are transmitted are known in the art, and can be found described in detail in U.S. Pat. Nos. 7,391,573 and 7,457,040, coassigned with the present invention.

Figure 13:
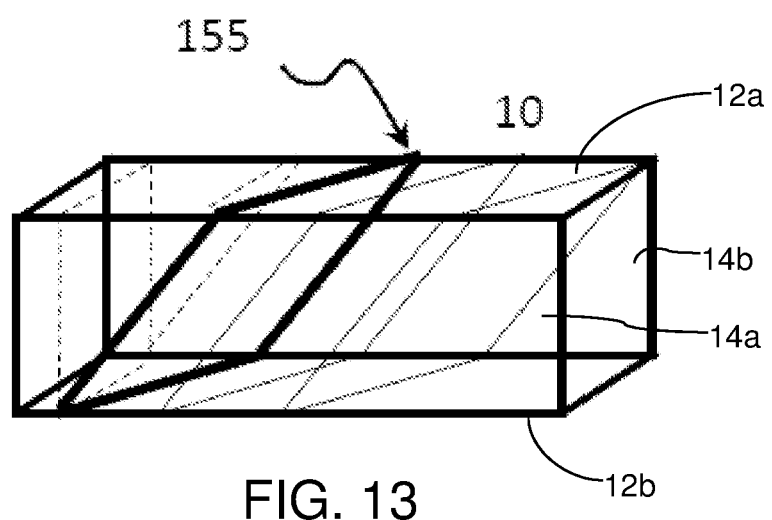
FIG. 13 is a schematic isometric view illustrating an implementation of a 2D waveguide with internal partially reflective facets inclined obliquely relative to relative to both sets of elongated parallel external faces.

FIG. 13 illustrates an alternative implementation in which the partially reflecting surfaces of first waveguide 10, here designated 155, are at an oblique angle to both faces 12a and 14a. (The dashed lines are intended to facilitate visualizing the inclination of the facets, by showing a plane perpendicular to both external faces, and another inclined relative to only one face.)

Figures 14A, 14B:
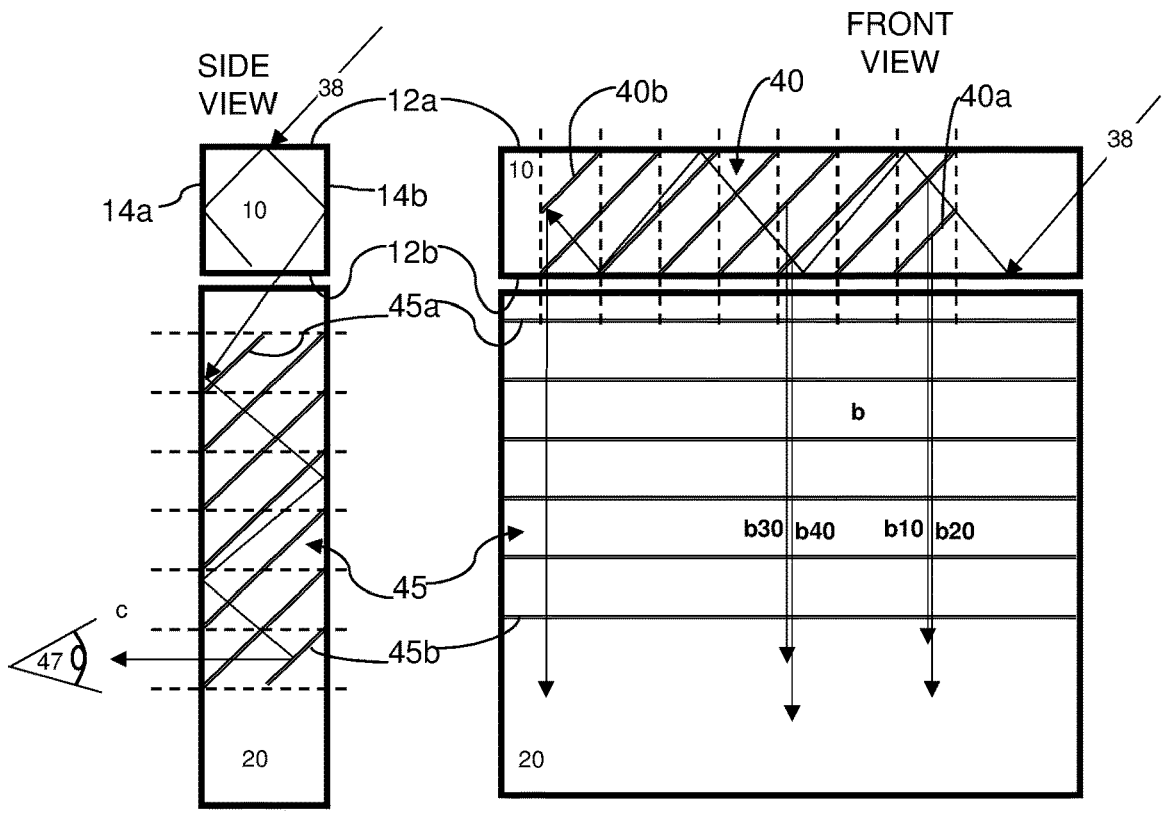
FIG. 14A and FIG. 14B are schematic side and front representations, respectively, of an optical aperture multiplier, constructed with overlapping facets.

Refer now to FIG. 14A and FIG. 14B are schematic side and front representations, respectively, of an optical aperture multiplier, constructed with overlapping facets. The general operation of the current figures is described above in reference to FIG. 12A and FIG. 12B. The overlapping of facets is applied in the 2D waveguide 10 as well as in the 1D waveguide 20. In this example, in FIG. 14B, the 2D waveguide 10 expands the optical aperture latterly (in the current figure from right to left) and the 1D waveguide 20 expands the optical aperture vertically (in the current figure from top to bottom) before transmitting the light to the eye of the observer 47.

In FIG. 14A, light (shown as incoming ray 38) is coupled into 2D waveguide 10. This waveguide includes overlapping facets 40. Dashed lines are used in the current figure to show alignment of the facets 40, which are shown as double-lines. In this implementation, the first facet 40a and the last facet 40b have smaller area than the middle facets of the internal facets 40. This enables light coupled out ('b') of the 2D waveguide 10 to be substantially uniform since the out-coupled light 'b' was originated by a constant number of facets including at the start and end of the 2D waveguide 10. For example, output ray b10 and output ray b20 (actually overlapping when output from waveguide 10, but shown slightly separated in the figure for clarity) produce a combined output that was originated by two facets (first facet 40a and an adjacent facet of the internal facets 40). Similarly, output rays b30 and b40 produce an output from two facets.

For comparison, refer back to FIG. 10B where the light output beam 2546 from the first full facet 2517 and the light output beam 2547 from the last full facet are coupled out as reduced energy. Using the partial first and last facets (40a, 40b) this reduced energy will be avoided since partial first facet 40a and partial last facet 40b are shorter to overlap the adjacent facets 40. Note, if the last facet illuminated is designed to have 100% reflectivity (100% of nominal reflectivity when used for augmented viewing), then the last facet will perform similar to complete facet 2515.

The overlapping facet configuration described for the 2D waveguide 10 works similarly for the 1D waveguide 20.

Internal facets 45 reflect the light to the observer 47. The 1D waveguide internal facets 45 are overlapping as described for 2D waveguide internal facets 40. Similar to partial first and last facets 40A and 40b, first and last facets 45a and 45b have reduced area in order to maintain illumination uniformity as described for 2D waveguide 10.

Figures 15A, 15B:
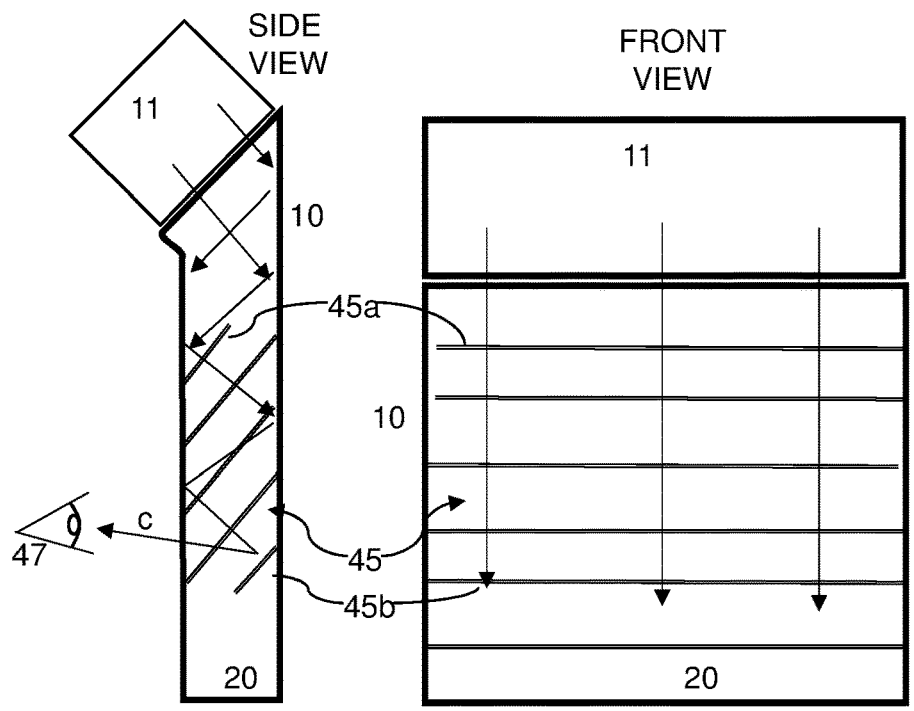
FIG. 15A and FIG. 15B are schematic side and front representations, respectively, of an optical aperture multiplier, altering the construction of FIG. 14A and FIG. 14B to perform expansion with a free space optical arrangement.

Refer now to FIG. 15A and FIG. 15B where the basic structure of FIG. 14A and FIG. 14B is altered replacing the 2D waveguide 10 to perform the lateral expansion with a free space optical arrangement 11 (for example as described in FIG. 5 and FIG. 6). The innovative overlapping structure of 1D waveguide 20 is still used to perform the vertical expansion.

Figure 16A:
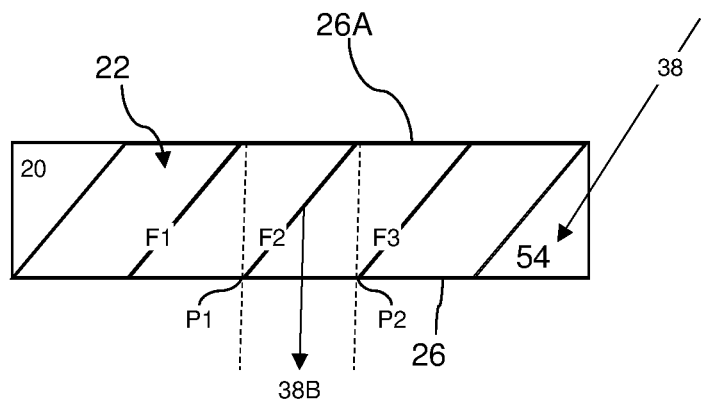
FIG. 16A to FIG. 16C are sketches of exemplary facet implementations.
Figure 16B:
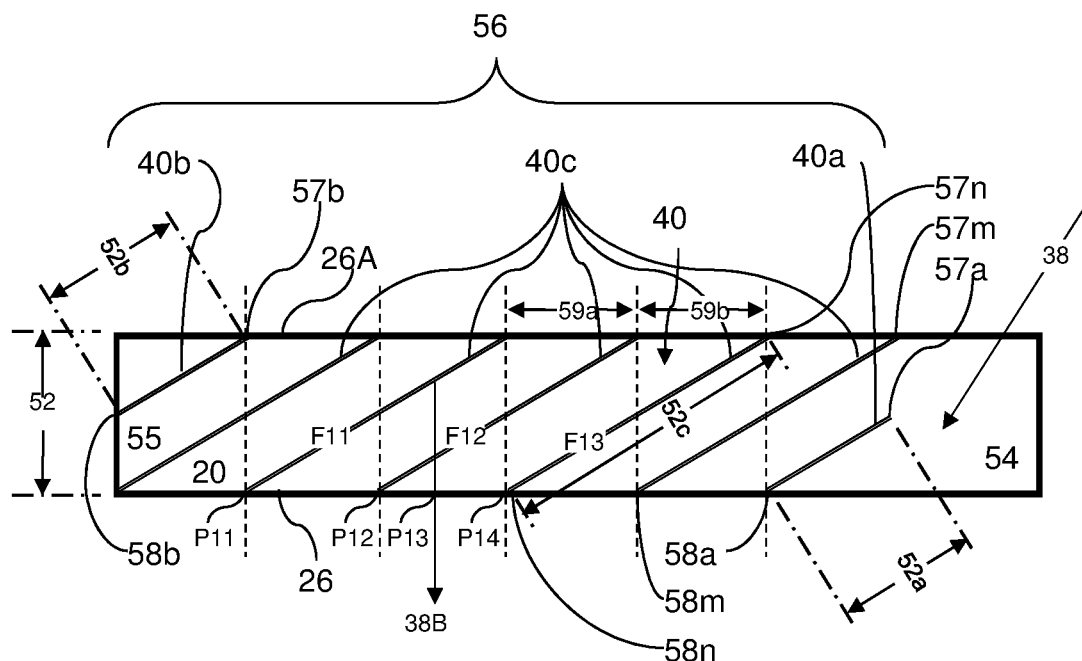
Figure 16C:
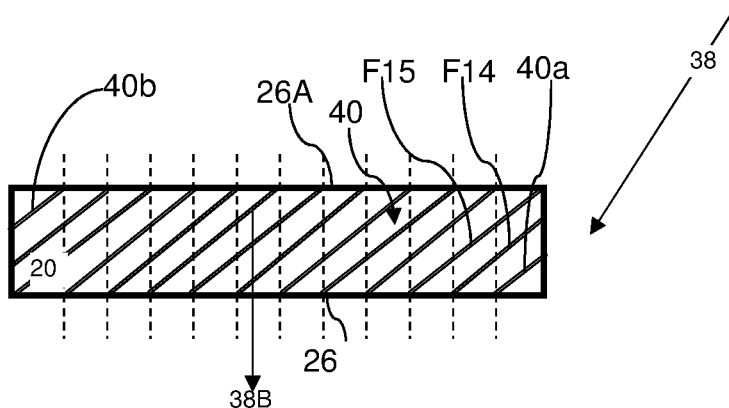

Refer now to FIG. 16A to FIG. 16C, sketches of exemplary facet implementations. The facets can be arranged in a variety of overlapping configurations, including but not limited to the amount of overlap, angle of facets with respect to the parallel surfaces (major edges, such as the pair of lower surface 26 and upper surface 26a) of the waveguide substrate, and reflectivities. Overlapping of facets can be implemented in what are referred to in the context of this document as single (non-overlapping), double, and triple (overlapping) facets. In general, overlap (by definition starting with "double facets") of two or more facets is referred to as "multiple facets", or "multiple overlap". Additional overlaps beyond triple are possible, as well as partial overlapping, as will be apparent from the current description and non-limiting examples. For clarity in the current figures, the propagation from incoming light ray 38 to outcoupling ray 38B is not shown.

FIG. 16A, for reference, shows a conventional implementation of single facets, or no overlap, as described above with reference to FIG. 2. Waveguide 20 includes facets 22, which are shown as double-lines, between the first two surfaces (26, 26A). A first region 54 is an area at which light (shown as ray 38) is coupled into the substrate. The solid arrow shows outcoupling rays 38B crossing only one facet (single facet crossing). Note that references to "crossing" facets and the number of facets being "crossed" includes counting the facet that is the origin of the outcoupled ray. Dashed lines are used to show alignment of the facets 22. In this single facet configuration, the facets 22 do not overlap, and specifically are configured with the end of one facet aligned with the beginning of an adjacent facet.

References to alignment will be obvious to one skilled in the art as relative to a geometrical projection of the facet onto one of the surfaces. For example, exemplary facet F1 facet-start has a geometrical projection onto lower surface 26 at point P1. Exemplary facet F2 facet-end has a geometrical projection onto lower surface 26 also at point P1. Exemplary facet F2 facet-start has a geometrical projection onto lower surface 26 at point P2. Exemplary facet F3 facet-end has a geometrical projection onto lower surface 26 also at point P2.

FIG. 16B is a sketch of a double facets (double facet crossing, double overlap). This is a preferred implementation, which experiments have shown to provide good results while minimizing increases in manufacturing complexity (as compared to higher-level crossings). The non-limiting example of a double facet overlap is generally used in this description. A waveguide (light transmitting substrate, waveguide 20) includes overlapping internal facets 40, which are shown as double-lines, between the first (two) surfaces (26, 26A). A solid arrow shows incoming light ray 38. Another solid arrow shows a nominal ray crossing two facets and then outcoupled from the substrate (arrow outcoupling ray 38B). This crossing of two facets (facet F11 and facet F12) is a double facet crossing. As in similar figures, dashed lines are used to show alignment of the facets 40. In this example, a single first partial facet 40a and single last partial facet 40b are shown.

The waveguide includes at least one pair of surfaces parallel to each other (lower surface 26 and upper surface 26A, referred to as "first surfaces"). A substrate width 52 is a distance between the first surfaces. A first region 54 is an area at which light (shown as ray 38) is coupled into the substrate.

The waveguide includes a sequence of facets 56. The sequence of facets 56 includes a first facet (40a), a last facet (40b), and one or more middle facets (40c). The first facet 40a is located proximally to the first region 54, where proximally is the nearest part of the sequence of facets 56. The first facet has a first width (52a) in a direction between the first surfaces (26, 26a).

The last facet 40b is at a distal end 55 of the sequence of facets 56 from the first region 54. The last facet 40b has a third width 52b in a direction between the first surfaces (26, 26a).

One or more middle facets 40c are located between the first facet 40a and the last facet 40b. The middle facets (each of) have a second width 52c in a direction between the first surfaces (26, 26a). For clarity, only one second width 52c is shown. In a typical implementation, the widths of all of the middle facets will be equal. However, this implementation is not limiting, and the widths of each facet can vary from one another, as is described below. The number of middle facets can vary depending on the application. Typical numbers of the one or more middle facets include one, two, three, four, five, and a plurality.

Each facet of the sequence of facets 56 is typically an at least partially reflecting surface, is at an oblique angle to the surfaces (26, 26a), has a facet-start on a proximal side of the facet width, and has a facet-end on a distal side of the facet width. Exemplary facet-starts are shown for the first facet 40a as point 57a; for a middle facet adjacent to the first facet 40a as point 57m, for a next middle facet as point 57n, and for the last facet 40b as point 57b. Similarly, exemplary facet-ends are shown for the first facet 40a as point 58a; for a middle facet adjacent to the first facet 40a as point 58m, for a next middle facet as point 58n, and for the last facet 40b as point 58b.

An alignment of the overlapping of the facets is now described. To begin, we define a geometrical projection being onto one of the surfaces (in this case we will use lower surface 26) in a direction of a nominal ray 38B outcoupled from the substrate 20. The nominal ray 38B is typically substantially a central ray of the light being coupled out of the substrate 20. Generally, the nominal ray 38B is a ray that a designer wishes to have optimal performance in the ray field. A nominal ray 38B can also be the optimal ray for a specific location on the substrate 20. In certain particularly preferred embodiments, the nominal ray is designed to be perpendicular to the parallel surfaces of the light guiding optical element, but depending on various design considerations, the nominal ray may be inclined relative to a normal to those parallel surfaces in one or two dimensions. Note that if a nominal ray 38B is not perpendicular to the parallel surface (for example 26) of the substrate 20, then the nominal ray 38B is at an angle to the surface, the nominal ray 38B will refract when outcoupling from the substrate 20, and be at a different angle outside the substrate 20. In the context of this document, normally reference is to the nominal ray 38B inside the substrate 20. Usually the nominal ray corresponds to a ray from the center or near the center of the incoming image. In some implementations, the nominal ray is the chief ray of the incoming image. Typically, the incoming light 38 corresponds to an image, and the central ray is a center ray from a center of the image. Additionally or alternatively, the incoming light 38 corresponds to an image, and the central ray corresponds to a central pixel of the image.

Next, the geometrical projection of the last facet 40*b* and each of the one or more middle facets 40*c* overlaps a respective geometrical projection of an adjacent one or more middle facets 40*c* and the first facet 40*a*. In other words, adjacent facets overlap. For example, last facet 40*b* at the distal end overlaps adjacent left-most (in the figure) middle facet, each of the middle facets 40*c* overlaps an adjacent middle facet, and the right-most middle facet at the proximal end overlaps the first facet 40*a*.

In addition, the geometrical projection of the facet-start of the last facet 57*b* and each of the one or more middle facets (such as 57*n*, 57*m*) preferably substantially coincides with a respective geometrical projection of a non-adjacent facet-end of the one or more middle facets (such as 58*n*, 58*m*) and the first facet 58*a*. In other words, each facet-start aligns, or is preferably in close alignment, with a non-adjacent facet-end in the direction of nominal ray outcoupling, (with the obvious exception of the first facet 40*a*, as there are no facet ends with which to align). The coinciding is along at least a portion of the substrate.

Alternatively, the overlapping of facets can be described as a constant number of facets overlapping in a line of sight toward a nominal point of observation of the light coupling out of the substrate via one of the surfaces. In other words, the nominal point is a typical location of an eye 47 of a user, the most probable location of a pupil of an eye of an observer. In some applications, the nominal point is the center of the eyeball of the observer. Internal facets are optimized to generate uniform reflection toward the observer by having constant number of facets overlapping in the line of sight toward a nominal point of observation.

A feature of the current embodiment is specific management of the configuration of the overlap of facets. In this case, of double-facet crossing, the facet-end of every first facet and middle facet is in the same line as the center of an adjacent middle facet or last facet. Similarly, the facet-start of every last facet and middle facet is in the same line as the center of an adjacent middle facet or last facet. In this case, the following exemplary facets have geometrical projections onto lower surface 26 at the following points:

Facet-end of facet F11 at point P11;
The middle of facet F11 at point P12;
Facet-start of facet F11 at point P14;
Facet-end of facet F12 at point P12;
The middle of facet F12 at point P14;
Facet-end of facet F13 at point P14; and
Ray 38B crosses facets F11 and F12 at point P13.

Thus, the proximal end of middle facet F11 overlaps the distal end of adjacent middle facet F12 and the facet-start of middle facet F11 aligns with the facet-end of nonadjacent middle facet F13.

The facets are normally parallel to each other and in constant spacing, that is, a spacing between one pair of adjacent facets of the sequence of facets is the same as a spacing between another pair of adjacent facets of the sequence of facets. For example, spacing 59*a* between facet F11 and facet F12 is substantially the same as spacing 59*b* between facet F12 and facet F13. The spacing between adjacent facets is typically larger than the coherence length of the light being coupled into the substrate. The coherence length is the propagation distance over which a coherent wave (e.g. an electromagnetic wave) maintains a specified degree of coherence. Generally, the coherence length is the wavelength squared, divided by spectral width. If facet spacing is changed along the waveguide, the conditions of overlapping should be preserved.

In a preferred embodiment, the first width of the first facet is less than the second width of the one or more middle facets. In other words, the first facet is a partial facet. In an exemplary implementation, the first width is substantially half of the second width.

In another option, the third width is less than the second width. In other words, the last facet is a partial facet, preferably half the width of the middle facets (the third width is substantially half of the second width). In another option, the last half facet has a reflectivity that is substantially 100% of a nominal reflectivity. For example, if the nominal reflectivity is 50% (as is the case with double overlap), then at the distal half end of the waveguide the last facet would have a reflectivity of 50%. For example in FIG. 10B if half of facet 2517 has 100% nominal reflectivity then ray 2546 will have same intensity as rest of the outcoupled light. Similarly, if half of facet 2515 has 100% reflectivity, then ray 2547 will also have the same intensity as rest of the outcoupled light.

The propagation of the light from the first region is such that at least a portion of the light encounters the first facet before encountering one of the one or more middle facets.

Refer now to FIG. 16C is a sketch of triple facets (triple facet crossing, triple overlap). Similar to the other examples, a waveguide (waveguide 20) includes overlapping internal facets 40, which are shown as double-lines, between the first surfaces (26, 26A). A solid arrow shows a nominal ray crossing three facets and then outcoupled from the substrate (arrow outcoupling ray 38B). As in similar figures, dashed lines are used to show alignment of the facets 40. In this example, multiple (specifically two) first partial facets and multiple (two) last partial facets are shown.

In general, a number of facets is crossed by the nominal ray outcoupled from the waveguide substrate. In the example of a double facet crossing, the number of facets crossed is two. Similarly, in the example of a triple facet crossing the number of facets crossed is three. In general, the number of facets crossed is constant for all of the sequence of facets. Constructing a waveguide with a constant number of facets crossed can be implemented in a variety of configurations. For example as described in reference to FIG. 16B the first width 52*a* of the first facet 40*a* can be substantially half of the second width 52*c* of the adjacent middle facet (one facet of the middle facets 40*c*). In another example, ¼ of the first facet and ¾ of the adjacent facet can be used. In another example, refer to FIG. 16C where both the first facet 40*a* and a first adjacent facet F14 are portions of the width of the next adjacent facet F15.

Based on the current description using an exemplary 1D waveguide (for example, the 1D waveguide 20) for implementation of overlapping facets, one skilled in the art will be able to implement overlapping facets for a 2D waveguide (for example, in the 2D waveguide 10) and other waveguide configurations.

Refer back to FIG. 14A, FIG. 14B, and FIG. 13. In general, in a 2D waveguide, the waveguide includes the first surfaces (26, 26*a*, or 12*b*, 12*a*) and a second pair of surfaces (14*a*, 14*b*). The second surfaces (14*a*, 14*b*) are parallel to each other and non-parallel to the first surfaces (12*b*, 12*a*). Similar to the widths of facets with respect to the first surfaces, the first facet has a fourth width in a direction between the second surfaces, the last facet has a sixth width in a direction between the second surfaces, and the one or more middle facets have a fifth width in a direction between the second surfaces. A feature of the 2D waveguide is that the facets are configured such that, when an image is coupled into the waveguide at the first region with an initial direction of propagation at a coupling angle oblique to both the first and second surfaces, the image advances by four-fold internal reflection along the waveguide, In an alternative embodiment, the second surfaces are perpendicular to the first surfaces. In another alternative embodiment, each of the facets is at an oblique angle to the second surfaces.

Refer now to FIGS. 17A to 17D, rough sketches of alternative facet configurations. In the current figures, the facets are parallel.

Figures 17A, 17B, 17C:
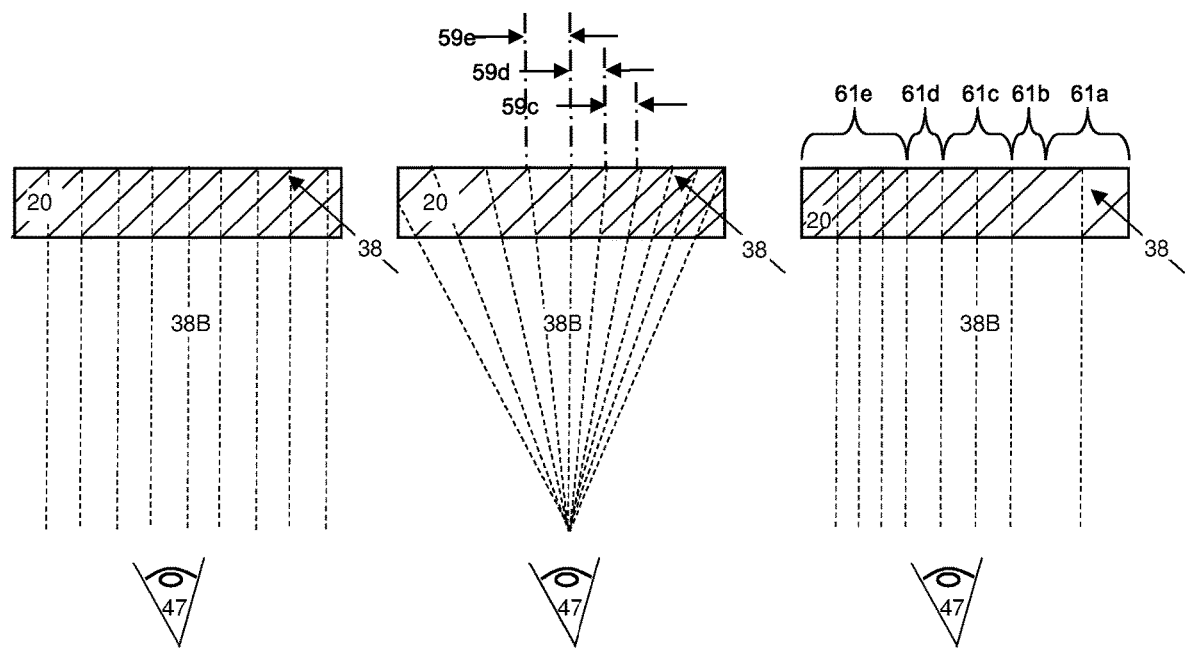
FIG. 17A is a rough sketch of double facets.
FIG. 17B is a rough sketch of varying facet spacing.
FIG. 17C is a rough sketch of decreasing facet spacing from the proximal end to distal end of the waveguide.

Refer now to FIG. 17A is a rough sketch of double facets, as described in detail in FIG. 16B, for comparison. Since the waveguide projects the image toward the eye 47 of a user, different light rays propagate at different angles, thereby generating overlap and underlap that reduce uniformity (introduce non-uniformity), as was described above with reference to FIG. 10A. The overlapping configuration of FIG. 17A (similarly FIG. 16B, and FIG. 10B) reduces this non-uniformity effect relative to the non-overlapping configuration of FIG. 10A (similarly FIG. 16A). For many applications, this double-facet configuration is sufficient, and the overlapping sufficiently suppresses non-uniformity.

Refer now to FIG. 17B, a rough sketch of varying facet spacing. Further reduction in non-uniformity from the double-facet configuration of FIG. 17A is shown in FIG. 17B where a spacing between one pair of adjacent facets of the sequence of facets varies relative to an adjacent spacing between another pair of adjacent facets of the sequence of facets. In a preferred embodiment, the spacing variation is monotonic between one pair of adjacent facets and an adjacent pair of adjacent facets. For example, spacing 59*d* is greater than spacing 59*c*, and spacing 59*e* is greater than spacing 59*d*. Note, the variations of spacing of the facets can be reduced due to refraction of the output rays 38B, as the output rays 38B bend toward normal when exiting the substrate (not pictured for simplicity). In the current configuration, different angles of the nominal wave are handled, and overlapping is constant for the observer (eye 47 of a user,). In this non-limiting example, the nominal output rays will always go through two facets. Note, in the current figure the nominal ray 38B at the center of the substrate 20 differs in angle from the nominal rays at the ends (such as proximal and distal) of the substrate 20.

Refer now to FIG. 17C, a rough sketch of decreasing facet spacing from the proximal end to distal end of the waveguide. The waveguide 20 includes a first spacing in a first portion of the waveguide and at least a second spacing in a second portion of the waveguide 20. In this non-limiting example, a first portion 61*a* includes non-overlapping facets. A second portion 61*c* includes double-overlapping facets, and another portion 61*e* includes triple-overlapping facets. Portions 61*b* and 61*d* are transition portions, or areas of transition from one discrete overlapping to another discrete overlapping. In alternative embodiments, the overlapping of the portions can be non-discrete, continually varying, or another spacing configuration designed to manage the effective output intensity from the waveguide.

In order to maintain constant reflected intensity along the waveguide, every facet must have higher reflective coefficient starting from the proximal end and increasing in reflectivity in the direction of the distal end. This management of reflected intensity improves the uniformity (uniformity of intensity) of the output to the observer. In the current figure, the reflectivity of every facet can be maintained constant while the spacing between the facets varies according to required reflectivity. The light is injected into the waveguide from the proximal end (right side of the current figure) and therefore has highest intensity on the proximal end. On the proximal end, the spacing between the facets is the largest, and there is minimal overlapping between the facets. As the light propagates along the waveguide (not depicted) the power of the light is reduced, and higher overlapping of the facets compensates for this reduction in power. Thus an overall power output is maintained along the waveguide.

Continuity can be maintained along the waveguide by non-continuous variation of an overlapping integer number or by continuous change (non-integer) at narrow spacing of facets, where overlapping discontinuity is not observed.

If spacing and height of facets is to be maintained constant across the waveguide, then an optimization procedure should consider the impact of overlap versus underlap of the facets. Overlapping facets offer more output power and more mixing of non-uniformity. Furthermore, overlap causes intensity change from 100% to 150% (or 100%±20%) while underlap generates 50% to 100% (or 100%±33%). In overlap, the relative intensity change is lower. Thus, the reflectivity of one or more of the facets varies from another reflectivity of another one or more facets in the sequence of facets.

Also note that an observer's eye does not respond linearly to intensity variations, rather the eye has a logarithmic response. This also implies that the underlap has more impact on observer perception. Given the above, more consideration should be given to reducing the underlap at the cost of increasing overlap.

Figures 17D, 18:
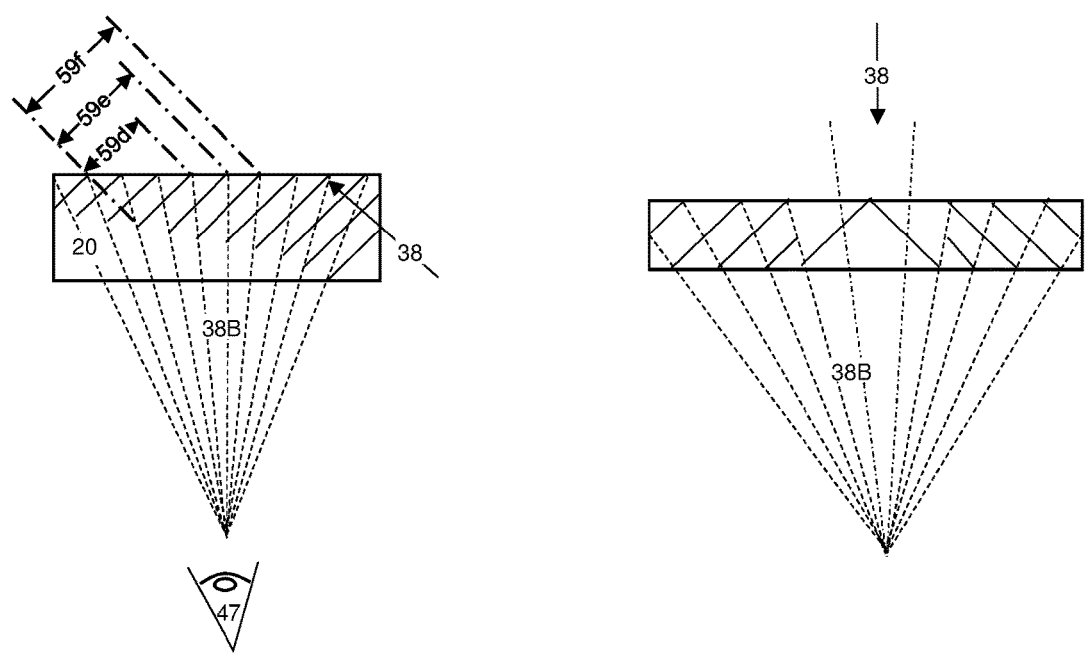
FIG. 17D is a rough sketch of varying facet width.
FIG. 18 is a rough sketch of applying overlapping facets to a symmetrical structure.

Refer now to FIG. 17D, a rough sketch of varying facet width. Further reduction in non-uniformity from the double-facet configuration of FIG. 17A is shown in the current figure, where a width of one of the facets of the sequence of facets varies relative to a width of an adjacent one of the facets of the sequence of facets. In a preferred embodiment, the width variation is monotonic between one of the facets and an adjacent facet for the entire sequence of facets. In the current figure, the width is shortened from the bottom toward the top of the waveguide as the sequence of facets is traversed from the proximal end to the distal end. An alternative implementation is to shorten the facet width from both sides (from the top and bottom toward the center of each facet). In the current example, width 59*e* is greater than width 59*d*, and width 59*f* is greater than width 59*e*.

In both the implementation of FIG. 17B changing the facet spacing and of FIG. 17D changing the facet width, the observer (eye 47 of a user) at the nominal convergence of the light-beams (output rays 38B) will not see overlap or underlap. However, any variation in eye position will generate some overlap/underlap that will be suppressed by the double facet configuration.

Refer now to FIG. 18, a rough sketch of applying overlapping facets to a symmetrical structure, such as described in reference to FIG. 6 and FIG. 8. In the current figure, only the top transverse waveguide is depicted, similar to the overlapping configuration of FIG. 17B. In this symmetrical configuration, the first region (similar to FIG. 16B first region 54) is an area at which light (shown as ray 38) is coupled into the substrate, in this case, a region in the middle of the waveguide. Each of the symmetric left and right sides of the waveguide has an area at which light is coupled into the respective sides of the substrate (alternatively referred to as a first region and second region that are adjacent), with the facets of the left and right sides being equal and of opposite inclination. This symmetrical structure can also be implemented with the parallel configuration of facets in FIG. 17A and the varying width configuration of FIG. 17D.

Refer again to FIG. 10B where in an overlapping configuration the (first full) facet 2517 and (last full) facet 2515 are partly not overlapped. As described above, specifically the beginning of facet 2517 does not overlap facet 2535 and the end of facet 2515 does not overlap facet 2535. Therefore, the intensity of the light coupled out (2546, 2547) is less intense in these non-overlapped sections. For example, in a double overlap configuration, half the first full facet is not overlapped and half the power will be coupled out from the non-overlapped part.

Several techniques can be used to overcome the problem of less intensity at the non-overlapped beginning and end sections.

1. Using shorter facets at start and end, as described above in reference to FIG. 14B elements 40a and 40b, and FIG. 16B.

2. Coating the non-overlapped section with a high reflective coating that increases the reflectivity of the non-overlapped section relative to the nominal reflectivity of the other (middle) facets.

3). Gradually changing the characteristic reflectivity of the facets from non-overlapping to overlapping, as described below.

The technique of gradually changing the characteristic reflectivity is now described using a double overlapping configuration for simplicity, but this technique can be applied for higher overlapping configurations.

Figure 19A:
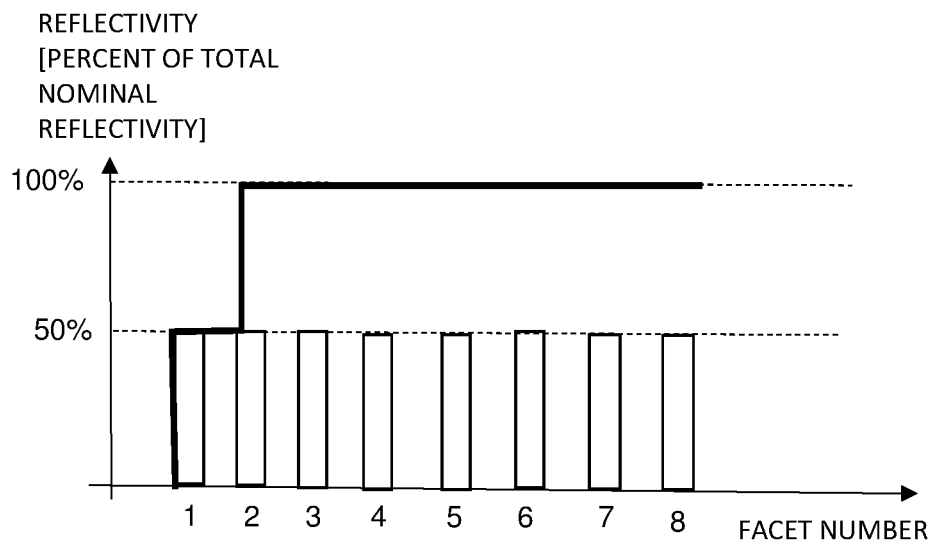
FIG. 19A is a graph of total nominal reflectivity in a double overlapping configuration.

Refer now to FIG. 19A, a graph of total nominal reflectivity in a double overlapping configuration. The x-axis shows the facets, starting at a facet numbered "1" (one) that is the first facet proximal to the first region 54 at which light is coupled into the waveguide (substrate). Increasing numbered facets are facets subsequent to facet "1" toward the distal end 55 of the waveguide. The y-axis shows reflectivity as a percent of total nominal reflectivity. Thin-line black boxes are the reflectivity (percentage of nominal reflectivity) of each individual facet, and the thick black line is the characteristic reflectivity—the effective reflectivity experienced by an outcoupled ray. Each facet is shown having a constant nominal reflectivity, for example, 50% of the nominal required reflectivity.

The characteristic reflectivity is the sum of the individual reflectivities for a portion of the waveguide at which a ray is outcoupled. As can be seen, the characteristic reflectivity outcoupling from the non-overlapped section from facet "1" in the current example is 50% (of nominal) as can be seen in FIG. 10B ray 2546 (or ray 2547). The characteristic reflectivity outcoupling from the overlap of facet "1" and facet "2" (overlapping of two adjacent facets) achieves 100% (of nominal). Hence there is a discontinuity between the beginning and subsequent portions of the waveguide (50% versus 100%).

Figure 19B:
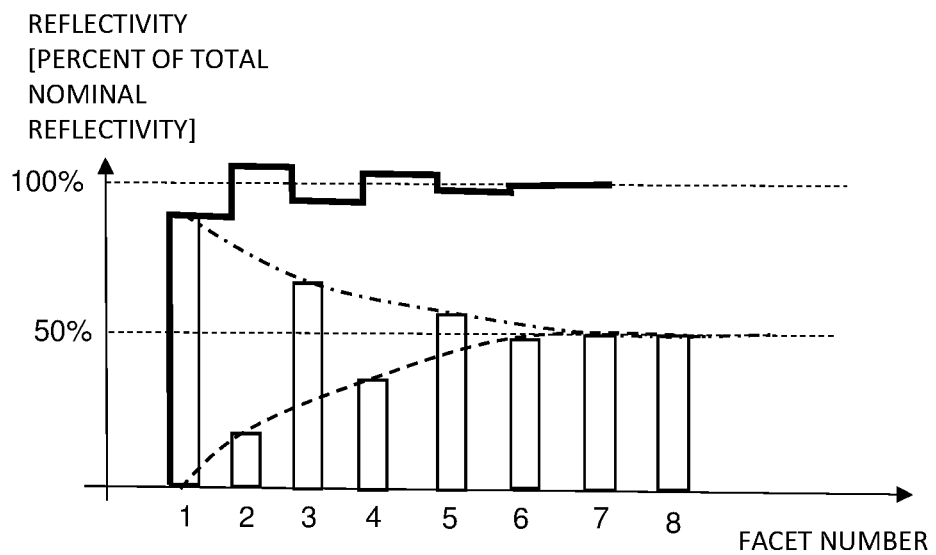
FIG. 19B is an exemplary graph of total nominal reflectivity in a double overlapping configuration using a change in alternating facet reflectivity.

Refer now to FIG. 19B, an exemplary graph of total nominal reflectivity in a double overlapping configuration using a change in alternating facet reflectivity. In the current figure, facet "1" (the first facet) is designed to approximate no overlapping (i.e. have approximately 100% the nominal), and facet "2" (the second facet) is designed to have minimal reflection. Thus, when combined, the first and second facets have approximately a no-overlapping characteristic reflectivity. Similarly, facet "3" (third facet) has almost as much reflectivity as facet "1", but reduced and facet "4" has almost as much reflectivity as facet "2", but increased. In the current figure, facets "7" and "8" have 50% (nominal) reflectivity resulting in a characteristic reflectivity as in the double overlapping configuration described in FIG. 19A. The dot dashed line represents the reflectivity of odd numbered facets (starting with more non-overlapping coating parameters) while the dashed line represents the reflectivity of even numbered facets (represent the increasing overlapping property). The thick-black (solid) line represents the characteristic reflectivity summing the reflectivity of two adjacent facets (as caused by double overlap and the first facet with no overlap) showing no half-reflectivity of the first half facet, as compared to the 50% characteristic reflectivity of facet "1" of FIG. 19A.

While the configuration of FIG. 19A has a discontinuity between the beginning and subsequent portions of the waveguide (50% versus 100%), the innovative configuration of FIG. 19B reduces this discontinuity. The residual discontinuity depends on convergence rate, for example for convergence after six facets the discontinuity will be approximately 10%. Thus, overcoming the problem of less intensity at the non-overlapped beginning and end sections. The current configuration can be repeated, in reverse, at the distal end of the waveguide. The slope of change of reflectivity (dot-dashed and dashed lines) can be altered to change the resulting effect and characteristic reflectivity of the sequence of facets. The waveguide can have a variety of combinations of overlapped and non-overlapped characteristic reflectivities over the length of the waveguide. For example, the current figure facets "4" and "5" could be repeated over at least a portion of the sequence of facets, without converging to the configuration of facets "7" and "8".

FIG. 20A illustrates a non-limiting but preferred process which may be used to produce first 1D waveguide 10. For clarity, in the drawings, the internal facets are depicted not in scale or density.

A set of coated transparent parallel plates are attached together as stack 400. The stack is cut diagonally (402) in order to generate a slice 404. If required, a cover transparent plate 405 can be attached on top and/or bottom (not depicted) of slice 404. The slice 404 is then cut perpendicular to the edges of the facets (dashed line on 404) if a 1D facet inclination is needed, or diagonally (dot-dashed line on 404) if a 2D facet inclination is needed, to generate the 2D waveguide 406.

FIGS. 20B-20E are an exemplary procedure for attachment of a coupling prism. The sliced 2D waveguide 406 is shown in FIG. 20B with overlapping facets (two facets reflecting per line of sight). This is a non-limiting example only, and non-overlapping facets are also possible.

As illustrated in FIG. 20B, the 2D waveguide 406 (depicted not transparent for clarity) is cut, for example, along the dotted line 420A as illustrated. This cut can be at any orientation, but a perpendicular cut alleviates tight index matching requirements. Preferably, as seen in FIG. 20C, the cut is performed where the overlapping facets exist (see cut end in FIG. 20C) in order to maintain uniformity of illumination. Otherwise, the first facet will reflect without overlapping resulting with reduced illumination. A transparent extension 413 can be added if required and prism 414 is attached to the waveguide 406, generating a 2D waveguide 416 with an extension and coupling prism (as shown in FIG. 20D). In cases where the extension is not needed, the coupling prism 414 may be directly attached to the waveguide 406 to generate the assembled waveguide 417 (as shown in FIG. 20D). The distal end of the waveguide 406 may be left, to allow any remnant light to be scattered therefrom, and may optionally be painted with light absorbent material (e.g. black paint) to minimize stray reflections.

FIGS. 21A-21D are an exemplary procedure for creating a waveguide with overlapping facets. In FIG. 21A, the sliced 2D waveguide 406 is cut, for example, perpendicular along both sides, along the dotted line 420A at what will become the proximal end of the waveguide, and cut along the dotted line 420B at what will become the distal end of the waveguide. This produces waveguide 420 having partial facets 40a and 40b at the respective proximal and distal ends. In FIG. 21B, in this example, waveguides 426 and 424 are attached respectively to the proximal and distal ends of the waveguide 420 and the combination (of 420, 424, and 426) polished to produce in FIG. 21C smooth external faces of combined waveguide 428. In this combined waveguide 428, the attached waveguides 426 and 424 do not have to have as accurate a refractive index as waveguide 406.

This method of production can also be applied to waveguide without overlapping facets, in order to eliminate the need for accurate refractive index matching.

In FIG. 21D, optionally, the smoothness and optical properties of the external facet of the combined waveguide 428 can be improved by attaching external faces 427 having refractive index matching, to produce waveguide 429.

Note, FIG. 21C and FIG. 21D depict separate components margins, however, for the light (such as incoming light ray 38), the margins are transparent, and only the external faces and the slanted coated internal facets reflect the light.

The current method (FIG. 20A to FIG. 21D) can be applied to a 1D waveguide as well as to a 2D waveguide.

The various embodiments in this description, such as varying facet spacing, width, and reflectivity, have been described separately for clarity. One skilled in the art will realize that these embodiments can be combined. For example, varying facet spacing to be decreasing while varying the widths of the facets from the proximal to distal ends of the waveguide.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for producing a light-guide optical element (LOE) comprising:
   (a) providing a stack of parallel-faced plates bonded together at interface planes and having partially-reflecting coatings applied at said interface planes;
   (b) slicing said stack along a pair of parallel major slicing planes to form a slice, said major slicing planes being non-parallel to said interface planes so that said slice includes parts of a plurality of said interface planes providing internal partially-reflecting facets within said slice;
   (c) cutting said slice perpendicular to said major slicing planes to form at least one end surface; and
   (d) assembling the LOE by attaching at least one additional block of transparent material to said at least one end surface and sandwiching said slice and said at least one additional block of transparent material between two face plates.

2. The method of claim 1, wherein said cutting is performed so as to bisect one of said internal partially-reflecting surfaces, thereby forming a half-facet.

3. The method of claim 1, wherein said cutting is performed so as to form two of said end surfaces, and wherein said assembling is performed by attaching two of said additional blocks of transparent material to said two end surfaces.

4. The method of claim 1, wherein said slicing is performed by slicing said stack along two perpendicular pairs of parallel major slicing planes to form a rectangular slice, both of said two pairs of major slicing planes being non-parallel to said interface planes, and wherein said end surface is perpendicular to both of said two pairs of major slicing planes.

* * * * *